(12) United States Patent
Hiltgen

(10) Patent No.: US 7,296,160 B2
(45) Date of Patent: Nov. 13, 2007

(54) SECURE USER AUTHENTICATION OVER A COMMUNICATION NETWORK

(75) Inventor: Alain P. Hiltgen, Zurich (CH)

(73) Assignee: UBS AG, Zurich (CH)

( * ) Notice: Subject to any disclaimer, the term of this patent is extended or adjusted under 35 U.S.C. 154(b) by 828 days.

(21) Appl. No.: 10/237,080

(22) Filed: Sep. 9, 2002

(65) Prior Publication Data

US 2003/0177392 A1    Sep. 18, 2003

(30) Foreign Application Priority Data

Mar. 18, 2002  (EP) .................................. 02006515

(51) Int. Cl.
- *H04L 9/00* (2006.01)
- *H04L 9/32* (2006.01)
- *G06F 11/00* (2006.01)

(52) U.S. Cl. .................. 713/172; 713/176; 713/159; 713/182; 726/9; 726/20; 726/22; 380/28; 380/30

(58) Field of Classification Search .................. None
See application file for complete search history.

(56) References Cited

U.S. PATENT DOCUMENTS

| | | | | |
|---|---|---|---|---|
| 5,706,427 A | * | 1/1998 | Tabuki ........................... | 726/5 |
| 5,778,071 A | * | 7/1998 | Caputo et al. ............... | 713/172 |
| 5,841,970 A | * | 11/1998 | Tabuki ........................... | 726/2 |
| 6,076,164 A | * | 6/2000 | Tanaka et al. ............... | 713/171 |
| 6,226,744 B1 | * | 5/2001 | Murphy et al. ............... | 726/5 |
| 6,226,752 B1 | * | 5/2001 | Gupta et al. ................... | 726/9 |
| 2001/0045451 A1 | | 11/2001 | Tan et al. ..................... | 235/375 |
| 2002/0023215 A1 | | 2/2002 | Wang et al. ................. | 713/171 |

FOREIGN PATENT DOCUMENTS

| WO | WO 00 74007 | 12/2000 |
|---|---|---|
| WO | WO 02/01517 | 1/2002 |

OTHER PUBLICATIONS

European Search Report.

* cited by examiner

*Primary Examiner*—Gilberto Barrón, Jr.
*Assistant Examiner*—Laurel Lashley
(74) *Attorney, Agent, or Firm*—Michael Bednarek; Paul, Hastings, Janofsky & Walker LLP

(57) ABSTRACT

The invention relates to a method of performing user authentication in a network system (10) that comprises a client (22) in communication via a first network (14) with a server infrastructure (16) including an entrance point of a second network and an application server in the second network. The client (22) has access via a user-controllable card reader (24) to a smart card (26). A first authentication key is associated with the smart card (26) and a second authentication key is associated with the card reader (24). In a first step user authentication is performed in context with an encryption process between the client (22) and the server infrastructure (16) using the first authentication key. A second user authentication step is performed between the client (22) and the application server using both the first authentication key and the second authentication key. Data authentication (secure signing) can be performed in addition to the user authentication described above.

26 Claims, 12 Drawing Sheets

SECURE USER AUTHENTICATION OVER A COMMUNICATION NETWORK

BACKGROUND OF THE INVENTION

1. Technical Field

The invention relates to the field of network security. In particular, the invention relates to a method, a server infrastructure and a network system enabling secure user authentication using a network client having access via a card reader to a smart card.

2. Description of the Prior Art

In recent years, an increasing number of novel applications like secure payment services and secure authentication services have become card-based. Today, there is a migration from cards using magnetic stripes to smart card technology, also known as integrated circuit (IC) or chip card technology. For example, nearly half of all bank cards currently circulating in Europe are already chip based and the percentage of chip based bank cards is steadily increasing.

The industry is taking advantage of the additional security offered by smart cards in ensuring a compatible secure infrastructure available for home devices. By using smart cards within the home environment, secure payment and authentication services can be offered to consumers, boosting remote services like e-commerce. Along with the field of e-commerce also additional domains like home-banking, security services and also e-government require the use of a secure and trustworthy smart card infrastructure.

Such a smart card infrastructure necessarily comprises a secure smart card reader like the card reader specified in the workshop agreement CWA 14174 of the European Committee for Standardization (CEN). A main target of this FINREAD (FINancial transactional IC card READer) initiative is to specify a smart card reader that provides security to many different types of applications. Consequently, the FINREAD card reader does not only support smart cards issued by banks but also smart cards issued for non-financial applications.

In view of the fact that a personal computer acts as a target for virus and Trojan horse attacks, the FINREAD card reader provides an additional level of security to make the personal computer or another consumer access device part of a secure and trusted environment. All processing within a specific scheme, that is related to a trusted handling, will only be processed through the FINREAD card reader. This ensures that any necessary information can authentically be acknowledged by the consumer.

Authentication of the FINREAD card reader is specified in chapter 10 of the CEN workshop agreement "Financial transactional IC card reader (FINREAD)—part 2: Functional requirements" (Ref. No. CWA 14174-2:2001 E) of July 2001. The main target of the FINREAD card reader authentication function is to allow a service provider like a financial institution or payments scheme to authenticate the origin of data sent by a FINREAD card reader. This function protects against a fake card reader sending data as a FINREAD unit and also against denying that an authenticated message was sent with a FINREAD card reader. The FINREAD card reader authentication function is based on a unique identification number possessed by every FINREAD card reader in addition to the capability of signing with a unique private key. The private key is stored in a tamper resistant security module of the FINREAD card reader that keeps all confidential information in a secure environment.

According to "Financial transactional IC card reader (FINREAD)—part 3: Security requirements" (Ref. No. CWA 14174-3:2001 E) of July 2001, chapter 6.3, FINREAD card reader authentication is cryptographically linked to a specific transaction and, if the authentication functionality is needed, it is activated during the transaction. During FINREAD card reader authentication, a digital signature with the card reader's private key is calculated. More specifically, data to be signed are provided to the security module of the FINREAD card reader for signature calculation with the private key. To have a consistent authentication function, the unique identification number is also included in the data signed.

Besides the unique private key mentioned above a corresponding public key is stored in the FINREAD card reader. The public key is recorded as a certificate which has previously been signed by a private key of a vendor. In order to perform card reader certificate verification, application providers using FINREAD card reader authentication will thus have to obtain the vendor public key.

Departing from applications like e-commerce, e-banking or e-government requiring the use of a secure and trustworthy smart card reader like the FINREAD card reader or any other card reader associated with an authentication key of its own, there is a need for a secure user authentication procedure. More specifically, there is a need for a method, a computer program product, a server infrastructure and a network system for performing user authentication on a higher security level using such a card reader in conjunction with a corresponding smart card.

SUMMARY OF THE INVENTION

With respect to a method, this need is satisfied by performing user authentication over a client in communication via a first network with a server infrastructure including an application server, the client having access via a user-controllable card reader to a smart card, a first authentication key being associated with the smart card and a second authentication key being associated with the card reader, the method comprising performing a first user authentication step between the client and the server infrastructure using the first authentication key, the first authentication step being performed over an established or in context with establishing an encrypted channel over the first network, and performing a second user authentication step between the client and the application server, preferably over the encrypted channel, using both the first authentication key and the second authentication key.

In other words, in a network system comprising a client infrastructure and a server infrastructure at least two separate user authentication steps are performed between the client infrastructure and the server infrastructure. These user authentication steps are performed using two authentication keys to establish an authenticated link that preferably stretches over an encrypted communication channel. Since the authenticated link involves the application server, it roots deeply in the server infrastructure. This increases security of authentication.

Preferably, the encrypted channel is established or has been established on the basis of an encryption key of the server infrastructure. The establishment of the encrypted channel may be controlled by the server infrastructure. The encryption key of the server infrastructure is either a symmetric or an asymmetric key. Preferably, an asymmetric public key is employed to agree about a symmetric key used for the encrypted channel.

A dependence of the first user authentication step, which involves the first authentication key associated with the smart card, on the encryption key of the server infrastructure may be introduced. This dependence may for example result from deriving a challenge from the encryption key and from signing this challenge with the first authentication key. In this way the first authentication step can be directly coupled to the encrypted channel established on the basis of the encryption key. In the context of this invention the term "signing" may include the step of hashing the data to be signed. Hashing may be performed by the same component that applies the key or by a different component. The second user authentication step may or may not be coupled to the encryption key of the server infrastructure.

Besides the application server the server infrastructure may include one or more further components. For example the server infrastructure may comprise a second network, preferably a secure intranet, in which the application server is arranged. Furthermore, the server infrastructure may have an entrance point into the second network. Thus the second network may be coupled to the first network via this entrance point.

During the first user authentication step an end-to-end connection may be established. Preferably, the first user authentication step is entrance point controlled and the second user authentication step is application controlled. However, the first user authentication step may alternatively be controlled by other components of the second network, like an application running on the application server. According to a preferred embodiment, the application controls at least the second user authentication step during which the authenticated link between the client and the application server is established.

The first user authentication step and the second user authentication step may be performed on the same layer or on different layers of the ISO-OSI 7 layer model. In one embodiment, the second user authentication step is performed on the application layer (layer 7) and the first user authentication step is performed on a layer below the application layer. For example, the first authentication step may be performed on the transport layer (layer 4) or a layer between the transport layer and the application layer.

Preferably, the first authentication step is performed in accordance with the secure socket layer (SSL) protocol, the transport layer security (TLS) protocol the wireless transport layer security (WTLS) protocol or any other protocol that links the establishment of an encrypted channel with an authentication routine. SSL and similar protocols are usually considered to be part of the transport layer and utilize asymmetric public key encryption to exchange information about a symmetric key based on which an encrypted communication channel is established. It should be noted, however, that other authentication protocols like IPSec, which runs on the network layer (layer 3) and requires a common secret key, might be used instead.

The first user authentication step and the second user authentication step may each comprise one or more substeps. The first user authentication step for example may comprise a first substep during which the encrypted channel is established. The first substep may further comprise authentication of the server infrastructure. In a second substep, the encrypted channel may be used to transmit information required for authenticating the client side. Preferably, the transmitted information comprises a certificate available to the client infrastructure.

If, as described above, a first substep comprises authentication of the server infrastructure (optionally in context with establishing an encrypted channel) and if the second substep comprises the actual user authentication using the first authentication key, or vice versa, the communication channel thus erected can be considered as mutually authenticated (secure) communication channel. This secure communication channel may stretch over an encrypted channel or over a channel that is not encrypted.

Since both the first user authentication step and the second user authentication step involve the first authentication key, the authentication security can be increased by performing an equity check to verify that the first authentication key has actually been used for both the first and the second user authentication step. Such a verification is especially useful if the authentication steps are controlled by different components, for example if the first user authentication step is controlled by the entrance point and the second user authentication step is controlled by the application server. Preferably, the verification is performed by the application server.

According to a preferred embodiment, the second user authentication step comprises a double signature. More specifically, in a first substep a challenge may be signed with the first authentication key to generate a first signature, in a second substep the first signature may be signed with the second authentication key to generate a second signature, and in a third substep the double signature may be transmitted over the secure communication channel. Preferably, the challenge is generated by the application server or another component of the second network and the double signature is transmitted back to the application server or the other network component.

The user authentication process may be started automatically or only upon user approval. For example, a user may be requested on a display device of the client or the card reader to approve that the authentication procedure is actually to be started. If a card reader is used for that purpose, the card reader may have appropriate input devices like buttons which enable a user controlled operation of the card reader with respect to approving the authentication request.

In the case of user approval, the card reader may automatically monitor a time interval during which a specific number of signatures is permitted. For example, a time interval may be monitored by the card reader during which two signatures with the first authentication key associated with the smart card and a single signature with the second authentication key associated with the card reader are permitted. Such a control of the card reader prevents a misuse of the authentication keys.

As has been mentioned above, the card reader may comprise a display. This display can be used to visualize the operation requested by the client or by a component of the server infrastructure. However, during its request for user approval the card reader preferably does not, or at least not explicitly, display the data to be signed by the smart card (first and second user authentication step) or the signature to be signed by the card reader (second user authentication step). The display of the card reader is preferably configured such that after a successful user authentication has been performed any further data to be signed by the smart card (data authentication) can be entirely displayed.

In addition to the first authentication key a further key may be associated with the smart card. The further key may be a specific, dedicated signature key or any another key which is not used for authentication purposes. If the further key is a signature key, a signed data transmission (data authentication), preferably over at least one of the secure communication channel and the encrypted channel, can be performed, for example between the client and the application server. However, in principle data authentication could also be performed by signing the data using the first authentication key associated with the smart card. In this case only a single key need to be stored on the smart card. Preferably, the signed data transmission is performed only after user authentication, i.e., via an authenticated link.

The signed data transmission may comprise a single or a double signature. In the case of a double signature, a first signature may be generated by signing data, for example plain data or a hash value derived from the plain data, with the signature key and this first signature may further be signed with the second authentication key associated with the card reader. The double signature can thus be used to ensure that the smart card is operated in a genuine card reader and cryptographically links reader authentication to a smart card based application. In the case of signatures giving message recovery only the double signature is subsequently sent to the server infrastructure. In the case a hash value has been signed, the double signature is transmitted together with the corresponding plain data to the server infrastructure.

Preferably, double signatures, which may for example be generated in context with a signed data transmission or the second user authentication step, are only used on the application layer. Contrary thereto, single signatures may be used for processes like SSL user authentication (first user authentication step) running on a layer below the application layer.

User approval requests are an important means for ensuring a secure and trustworthy environment. Although user approval requests may in principle be generated by any network component like the client, the entrance point or the application server, user approval requests that are generated by the card reader are especially advantageous as far as security and confidentiality are concerned. The reason therefore is the fact that the card reader then functions as a guard between the smart card and external components accessing the smart card. Consequently, the card reader can ensure that the first authentication key is never used without requesting user approval for authentication and the signature key is never used without displaying at least a part of the information to be approved by the user, i.e., to be signed with the signature key.

According to a preferred embodiment, additional functions relating to a remote smart card management are implemented. To that end, an end-to-end management channel between the second network and the smart card, preferably over at least one of the encrypted channel and the secure communication channel, may be established. The remote smart card management environment may be configured such that the card reader recognizes smart card management commands and forwards them transparently to the smart card without interpreting the management commands. The management commands may be directed to modifying files or creating new files on the smart card.

In order to create the management channel, a dedicated smart card management component may be provided. Such a management component may for example be a server which is arranged in the second network and acts as a certificate authority. In this case the certificate authority communicates via the end-to-end management channel with the smart card. The certificate authority is in charge for creating and/or updating one or more certificates associated with and preferably stored on the smart card. Also, the certificate authority may replace or add new keys on the smart card. The management functionality implemented via the management channel might also comprise the uploading and/or personalizing of applications (after issuance of the smart card) and smart card auditing.

The method according to the invention may be implemented using appropriate hardware and software components. As far as the software is concerned, the invention concerns a computer program product having program code means for performing the steps of the method when the computer program product is run on a computer system. The computer program product may be stored on a computer readable recording medium.

From a hardware point of view the invention may be configured as a network system comprising the client infrastructure and the server infrastructure outlined above. Between the client infrastructure and the server infrastructure the encrypted channel is established prior to or in context with the first user authentication step. Via the encrypted channel an authenticated link, a signed data transmission and/or a secure management channel can be erected. In order to ensure compatibility between a specific application running on the client and different smart cards, a wrapper can be provided which appropriately configures the client for client-smart card communication. The card reader of the client infrastructure may be a class 4 reader (or higher) or a FINREAD-compatible card reader.

A server infrastructure according to the invention, which is linked via the first network to the client infrastructure, comprises the application server, the encrypted channel across the first network, as well as the authenticated link, preferably in the form of a mutually authenticated link stretching over the encrypted channel. The first network, which connects the client infrastructure and the server infrastructure, may be the Internet or any other insecure external network. The second network, which comprises the application server, is preferably a secure intranet.

The entrance point from the first network into the second network may be a dedicated hardware or software component. For example, a separate proxy server, possibly in a DeMilitarized Zone (DMZ) and/or a third network in the form of a public internal network like a DMZ may be used. The entrance point may also be situated in the form of an additional hardware or software component on the application server.

A public access DMZ server provides an extra measure of security for the second network. Furthermore, network throughput is increased since external traffic no longer appears on the second network. The DMZ may be realized as a software implementation running on an internal host like a workstation or server to be used as the DMZ server.

Instead of or in addition to a DMZ, a proxy server component may be provided. The proxy server is used to access information like pages of the world wide web (WWW) stored on a further (application) server. When a client requests such information, it is retrieved by the proxy server and then sent to the requesting client. The net effect of this action is that the remote server hosting the information never comes into direct contact with anything other than the proxy server.

If a management channel between the second network and the smart card is to be established, the second network preferably comprises a server functioning as a certificate authority generating management commands relating to the management of a certificate associated with the smart card. The certificate authority functionality of the second network preferably comprises not only management of one or more smart card certificates after issuance of the smart card but also generation of one or more certificates of the smart card prior to issuance thereof. Consequently, the complete certificate authority functionality may be associated with the same network which supports the application utilizing the certificate associated with the smart card for purposes like authentication, generating digital signatures, and the like.

DESCRIPTION OF THE DRAWINGS

Further advantage of the invention will become apparent upon reference to the following description of a preferred embodiment of the invention in the light of the accompanying drawings, in which.

DESCRIPTION OF A PREFERRED EMBODIMENT

Although the present invention can be practiced in any network system requiring user authentication via a card reader having access to a smart card, the following description of a preferred embodiment is exemplarily set forth with respect to an Internet based application in form of a secure e-banking solution.

1. Network System

Figure 1:
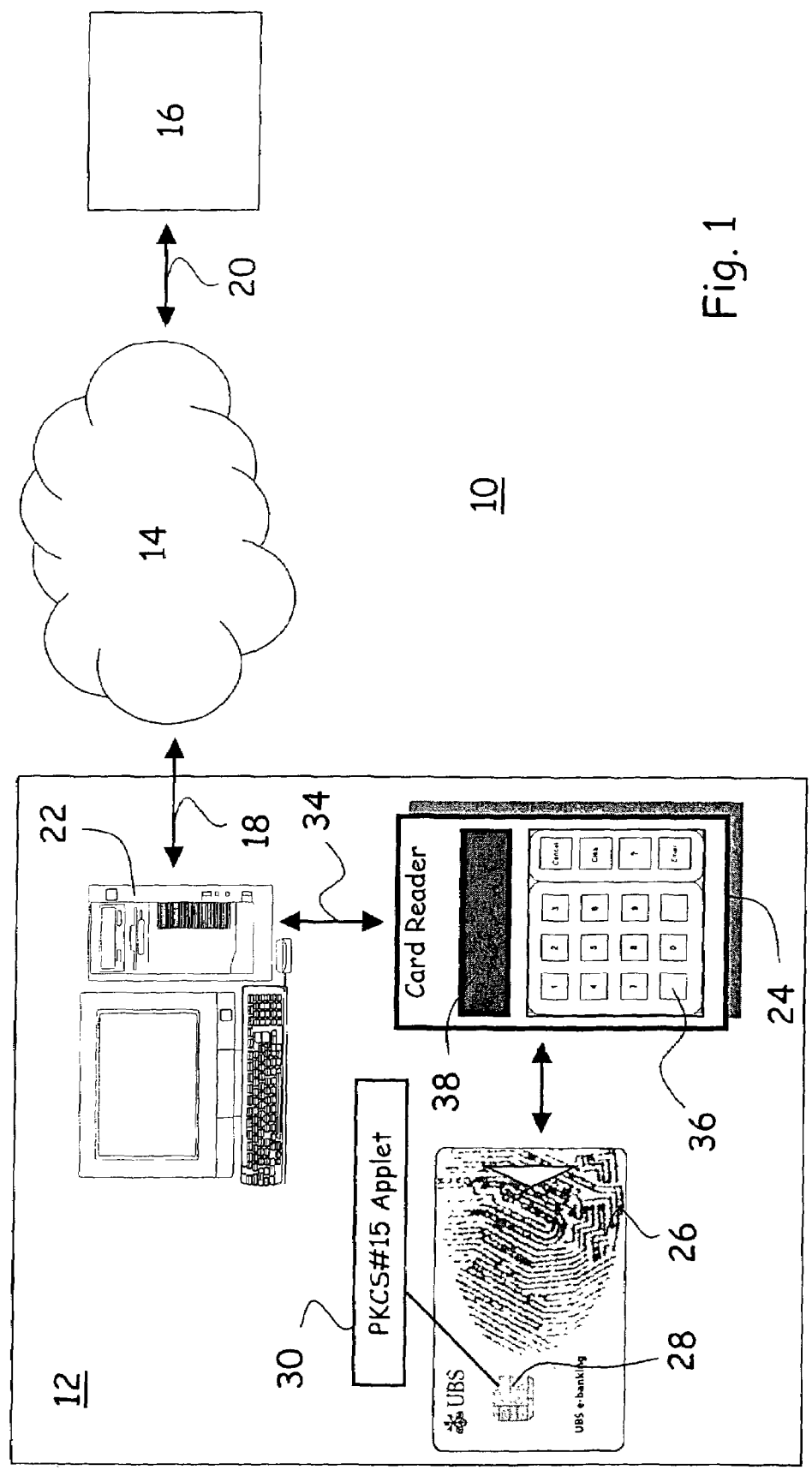
FIG. 1 shows a schematic diagram of the network system according to the invention with details of the client infrastructure.

In FIG. 1 a network system 10 according to the invention is schematically depicted. The network system 10 comprises a client infrastructure 12 which communicates via a first network in the form of the Internet 14 with a remote server infrastructure 16. Although in FIG. 1 only a single client infrastructure 12 is shown, the server infrastructure 16 may communicate with a plurality of client infrastructures simultaneously.

The communication link 18 between the client infrastructure 12 and the Internet 14 may be a wireless or a wireline connection. The same applies for the communication link 20 between the Internet 14 and the server infrastructure 16.

1.1 Client Infrastructure

As can be seen from FIG. 1, the client infrastructure 12 comprises a client 22, a card reader 24 and a smart card 26.

1.1.1 Smart Card

The smart card 26 is a so-called Java card with an IC 28 that supports a PKCS#15 application 30. PKCS stands for Public Key Cryptography Standards. These standards allow applications ranging from WAP browsers to secure e-mail clients to interoperate with one another. PKCS#15 describes a standard for the format of cryptographic credentials (certificate and private key) stored on cryptographic tokens like the smart card 26.

Messaging between the smart card 26 and a corresponding interface device is performed by means of specific commands/response Application Protocol Data Units (APDUs) of the PKCS#15 application 30 which runs on the smart card 26. Several PKCS#15 command APDUs will later exemplarily be described in more detail.

The IC 28 of the smart card 26 provides memory locations for a plurality of credentials to be stored on the smart card 26. A first set of credentials stored on the smart card 26 is used for user authentication. These credentials comprise a 1024 RSA private key $K_{PRIV\_AUT\_CLIENT}$, which is generated on the smart card 26 during card personalization, and a X.509 client certificate $C_{AUT\_CLIENT}$, which is issued by a dedicated application provider's client authentication Certificate Authority (CA) and which is stored during card personalization.

A second set of credentials stored on the smart card 26 is used for signing data relating for example to banking transactions. The second set of credentials comprises a 1024 bit RSA private key $K_{PRIV\_SIG\_CLIENT}$, which is generated on the smart card 26 during card personalization. The second set of credentials further comprises a X.509 client certificate $C_{SIG\_CLIENT}$, which is issued by a dedicated application provider's banking transaction CA and which is stored during card personalization. It should be noted that in the present embodiment the certificates for authentication and signing are issued by different CAs. This has the advantage that browsers running on the client 22 can automatically select the correct certificate for doing client authentication. It should further be noted that all certificates may be anonymous.

A third set of credentials stored on the smart card 26 is used for PKCS#15 file system management. The third set of credentials comprises a card specific (derived) Triple Data Encryption Standard (DES) key $K_{EA}$ used for authentication and encryption if a secure channel for file system management purposes like updating a certificate on the smart card 26 is established between the server infrastructure 16 and the smart card 26. The third set of credentials further comprises a card specific (derived) Triple DES key $K_{MAC}$ used for Message Authentication Code (MAC) generation if a secure channel for file system management purposes is established between the server infrastructure 16 and the smart card 26. MAC designates a cryptographic hash function which is needed for the hash value of a secret key. The DES keys may be derived during card personalization using the unique 4 byte chip ID of the IC 28.

In order to manage the PKCS#15 application as well as the smart card 26 from the remote server infrastructure 16 in a secure way, an Open Platform (OP) interface is provided. An OP Card Manager is a card management instance always present on an OP compliant Java card like the smart card 26. It provides means to execute card management functions such as application loading, application deletion, card auditing, etc. The OP Card Manager on the smart card 26 holds three card specific Triple DES keys which are derived during card personalization. A first key $K_{EA\_CM}$ is used for OP authentication and encryption, a second key $K_{MAC\_CM}$ is used for OP MAC generation and a third key $K_{KEK\_CM}$ is used for OP key encryption.

The smart card 26 is accessed from two sources, namely from a browser running on the client 22 and a dedicated (Java Script) program included in the web page provided by the server infrastructure 16. Whereas the browser accesses the smart card for performing client authentication below the application layer, the dedicated program included in the web page uses the smart card 26 to execute security functions on the application layer such as transaction signing and additional client authentication. To gain access to the smart card 26 the dedicated program makes use of a signed Java applet running inside the browser.

1.1.2 Card Reader

The card reader 24 provides access to the smart card 26 and communicates via a communication link 34 with the client 22. This communication link 34 may be a wireline connection like a Universal Serial Bus (USB) connection or a wireless connection for example according to the Bluetooth standard. The card reader 24 allows personalization and software updates and preferably complies with at least one of the FINREAD and the class 4 requirements.

As can be seen from FIG. 1, the card reader 24 has a keypad 36 for secure Personal Identification Number (PIN) management. The card reader 24 ensures that the keypad 36 can only be used from the internal reader software and not from software running on the client 22. In addition to the keypad 36, the card reader 24 has a display 38 which is used to display for example data prior to its submission to the smart card 26. As for the keypad, the card reader 24 ensures that the display 38 can only be operated from the internal reader software and not from software running on the client 22. This guarantees that the data displayed is appropriate to the key used for signature generation. As will be explained in more detail below, this means that a standard request is displayed in the case $K_{PRIV\_AUT\_CLIENT}$ is to be used and that the entire transactional data to be signed are displayed in the case $K_{PRIV\_SIG\_CLIENT}$ is to be used.

The card reader 24 can be operated, at least for specific (compatible) smart cards 26, in a "secure mode". In the secure mode of the card reader 24 at least some commands are not forwarded to the smart card 26 without being displayed on the display 38. This is necessary to enforce security features such as secure PIN management. Additionally, the card reader 24 exemplarily described in context with the embodiment depicted in FIG. 1 comprises a "transparent mode" for smart cards which are not compatible with the secure mode. In the transparent mode, the card reader 24 displays no commands and forwards the commands to the smart card without taking any action.

The card reader 24 is configured such that it is capable of generating 1024 bit RSA signatures with its private key. This involves executing a hash function, in accordance with the SHA-1 algorithm, over variable length input data. The result, a 160 bit digest, is to be processed in compliance with PKCS#1. In order to allow a component of the server infrastructure 16 to check whether a specific card reader 24 has been used for a certain operation or not, the card reader 24 is configured to sign data received from the smart card 26 when the card reader 24 is in the secure mode as will be described later in more detail.

The card reader 24 is securely personalized with unique private keys and corresponding certificates during reader production. The certificates may be pre-generated by an application provider's CA and then provided to the card reader manufacturer for personalization. This offers the advantage that the CA private key does not have to be available at the reader manufacturer's site for certificate generation.

The card reader 24 is initialized with an individual 1024 bit RSA private key $K_{PRIV\_READER}$ accompanied by a X.509 reader certificate $C_{READER}$. Furthermore, the card reader 24 hosts credentials used for updating the reader software based on public key cryptography. Software updates are signed with keys that are controlled by the application provider who operates the server infrastructure 16. This signing of the incoming data ensures that only authenticated software updates are accepted. Thus, integrity and authenticity is provided. Any update of the reader software must be performed such that the application data set during initial reader personalization are not destroyed, i.e., that keys and certificates persist.

The card reader 24 provides means like a security module for secure, tamper resistant storage of cryptographic keys. In particular, $K_{PRIV\_READER}$ used for reader authentication as well as the keys used to protect the software update procedure must be stored in such a secure memory location. The secure memory location is not removable from the card reader 24 and can not be accessed from software running on the client 22.

1.1.3 Client

The client 22 may be a personal computer (PC) or any other component that is able to establish a connection via the Internet 14 to the server infrastructure 16 on the one hand and to the card reader 24 on the other hand. For example, the client 22 may also be constituted by a mobile terminal like a mobile telephone that communicates with the server infrastructure 16 via the Internet 14 in accordance with the Wireless Application Protocol (WAP) and that communicates via a Bluetooth connection with the card reader 24. In the following it is supposed that the client 22 is constituted by a PC.

Figure 2:
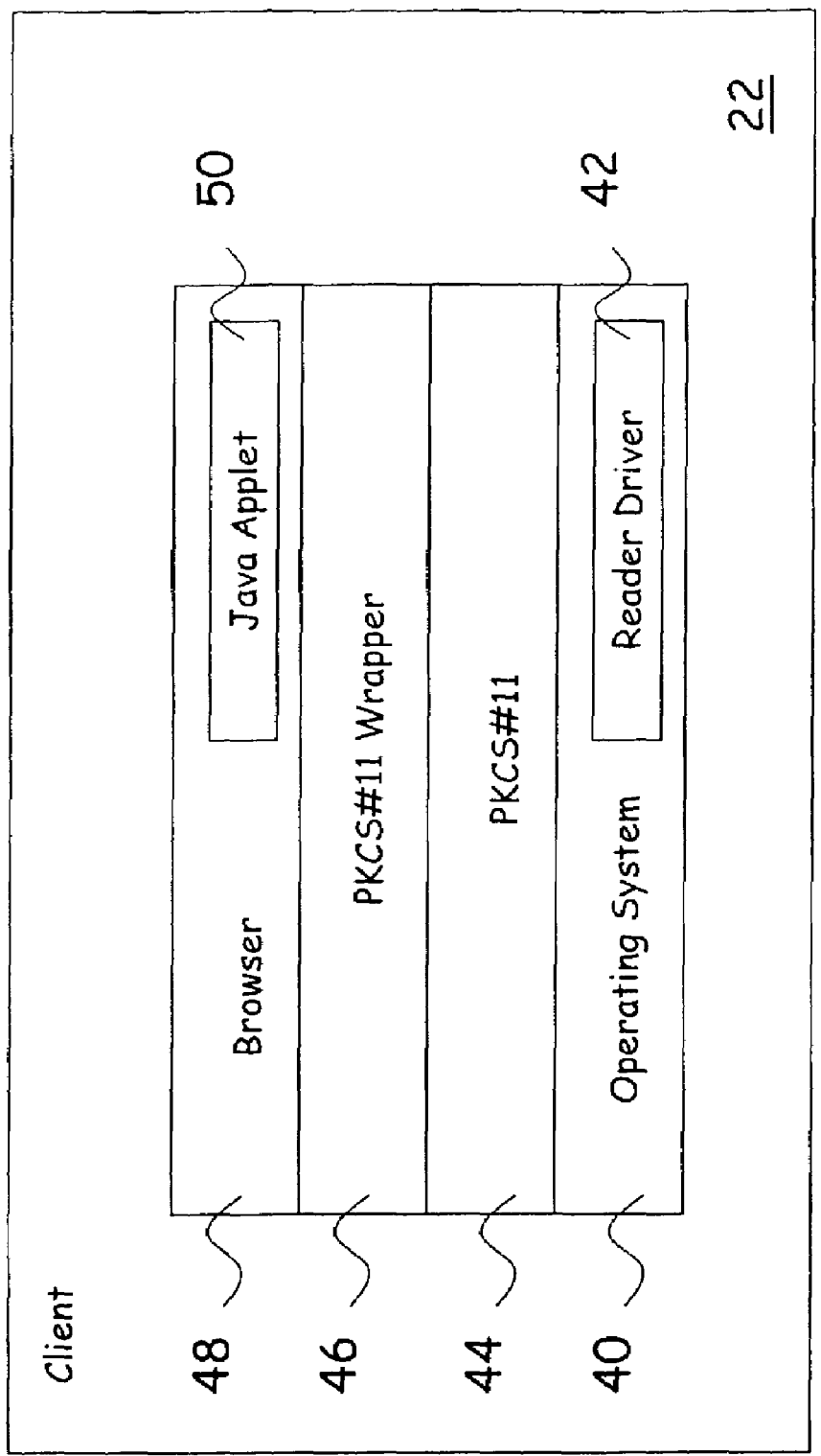
FIG. 2 shows the software stack of the client.

In FIG. 2, the software stack of the client 22 is schematically depicted. The lowest layer is constituted by the operating system 40 and a reader driver 42. The layer 40 of the operating system is followed by a PKCS#11 layer 44 which forms a smart card interface. PKCS#11 defines a technology independent programming interface for cryptographic tokens like the smart card 26. The PKCS#11 layer 44 is required for standard functions such as SSL user authentication or Secure Multipurpose Internet Mail Extension (S/MIME, or simply secure e-mail) support.

According to the invention, the standard PKCS#11 architecture is supplemented with a plurality of extensions. For example, the standard PKCS#11 functionality is supplemented with respect to reader certificate retrieval. This means that in addition to reading all the information from the smart card 26 the card reader's 24 certificate $C_{READER}$ may be retrieved also. $C_{READER}$ is requested by means of a PKCS#15 command APDU called GET READER CERTIFICATE. Obviously, this is not a smart card command. Upon receipt of the GET READER CERTIFICATE command APDU the card reader 24 does not send or forward any command to the smart card 26. Instead, the card reader 24 returns the requested part of $C_{READER}$ to the client 22. Typically, the card reader 24 returns full-length response APDUs except in the case of the last part of $C_{READER}$. If the requested certificate part is not available, the card reader 24 returns an error message. This allows the client software to increment a specific counter until an error occurs, which indicates that $C_{READER}$ has completely been read.

A further supplemental functionality of the PKCS#11 layer 44 concerns remote smart card management. In the preferred embodiment, smart card management is based on a secure end-to-end connection between an application server or another component of the server infrastructure 16 and the smart card 26. To build up such a secure management channel it is required to forward management related APDUs directly to the card reader 24, bypassing the PKCS#11 layer 44. This requires a special extension in the PKCS#11 library which allows to transparently route smart card management related APDUs through the PKCS#11 layer 44.

A third PKCS#11 extension relates to the generation of double signatures. To that end the PKCS#11 functionality is extended such that clear text messages of arbitrary length can be signed and that double signatures may be returned. This functionality is based on a PKCS#15 command APDU called COMPUTE DIGITAL SIGNATURE.

Returning to FIG. 2, on top of the PKCS#11 layer 44 a PKCS#11 wrapper layer 46 is arranged. In the case where multiple PKCS#11 libraries for different types of smart cards are required, the PKCS#11 wrapper automatically selects the appropriate PKCS#11 library without involving the user. The PKCS#11 wrapper dispatches all Application Program Interface (API) calls to the appropriate card specific PKCS#11 library. The wrapper can be omitted if only a single type of smart card 26 needs to be supported.

As shown in FIG. 2, a browser 48 is arranged on top of the PKCS#11 wrapper layer 46. Depending on the type of browser 48 used, additional software components may be arranged between the browser 48 and the PKCS#11 wrapper layer 46. For example in the case the Microsoft Internet Explorer is used, a Cryptographic Service Provider (CSP) layer is necessary to access the smart card 26 for SSL user authentication and S/MIME. To gain access to the smart card 26 the browser 48 makes use of a Java applet 50 running inside the browser 48. The Java applet 50 is signed by a component of the server infrastructure 16. Instead of the Java applet 50, a Component Object Model (COM) or a browser plug-in could be used.

1.2 Server Infrastructure

Figure 3:
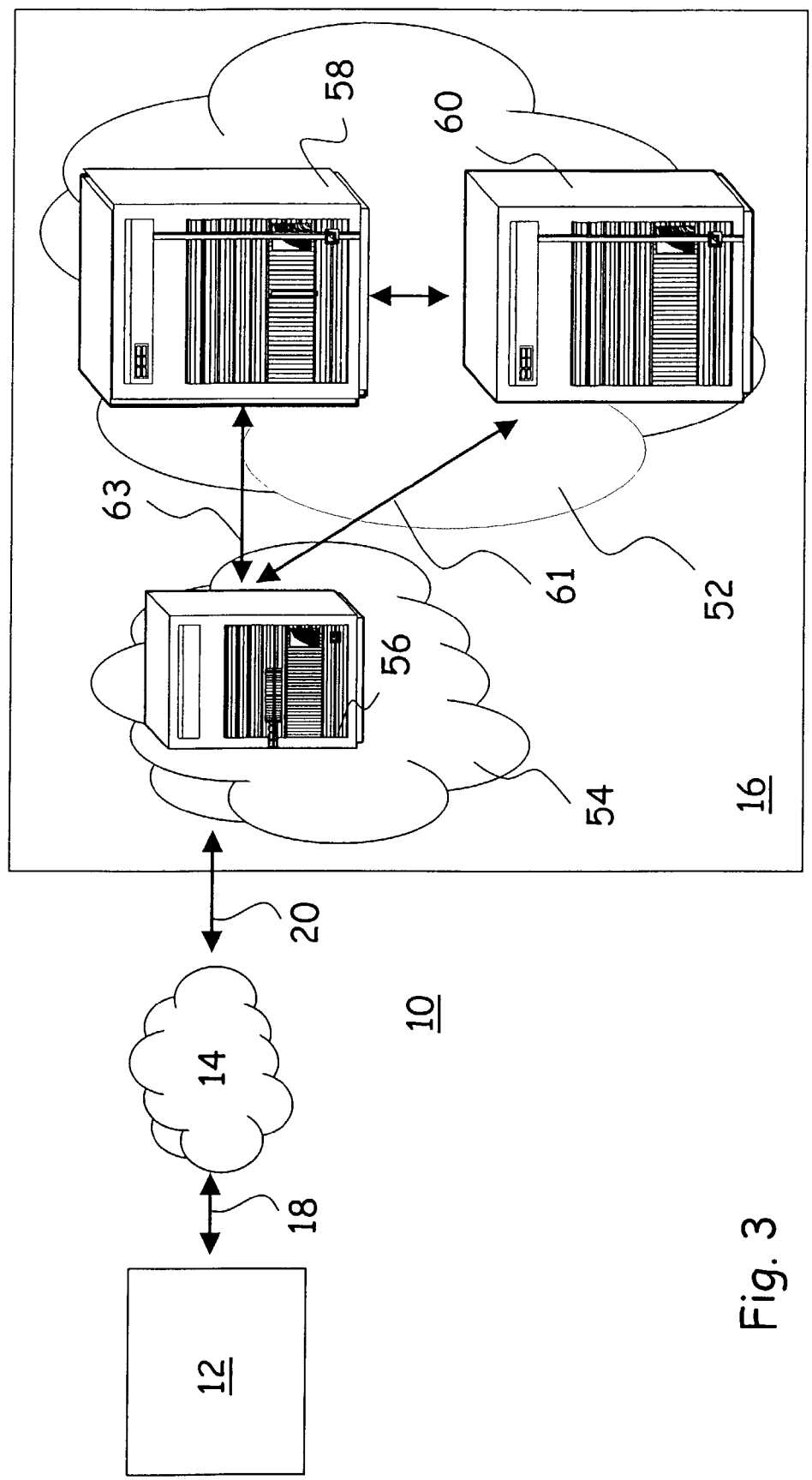
FIG. 3 shows the network system according to the invention with details of the server infrastructure.

In FIG. 3 the network system 10 is depicted in more detail with respect to the server infrastructure 16. As becomes apparent from FIG. 3, the server infrastructure 16 comprises a second network in the form of a secure intranet 52 and a third network in the form of a DMZ 54. The client infrastructure 12 has access via the Internet 14 and the DMZ 54 to the intranet 52.

The intranet 52 depicted in FIG. 3 comprises two servers. A first server arranged in the intranet 52 serves as an application server 58 and a second server 60 provides CA functionalities. The CA server 60 is in charge for remote smart card management. To that end, the CA server 60 establishes a secure management channel to the smart card 26 as will be described in section 2.6 below. The application server 58 hosts a home-banking entrance web page as well as a secure banking web page. Details concerning access to these web pages will be discussed below.

It should be noted that the DMZ 54, the proxy server 56 as well as further software and/or hardware components functioning as an entrance point with respect to the intranet 52 need not be co-located with the intranet 52 as long as appropriate communication links 61, 63 to the application server 58 and the CA server 60 can be established. Alternatively one or more of these entrance point functionalities may be realized by appropriate software or hardware modules situated on the application server 56.

Most aspects of the invention can also be practiced if the CA server 60 is not part of the intranet 52 but is operated by an external service provider. Furthermore, if only the remote smart card management functionality according to the invention is required, the user authentication process may be omitted.

2. Application Flow 2.1 Establishing a Connection Between the Client and the Server Infrastructure To start a session the client 22 establishes a communication link 18 to the Internet 14. The client 22 then connects via the Internet 14 to the server infrastructure 16 to retrieve an entrance web page hosted by the application server 58. As is shown in FIG. 3, this connection involves the second network's 52 entrance point which, in the embodiment depicted in FIG. 3, comprises the DMZ 54 and the proxy server 56.

The entrance web page loaded by the client 22 includes the signed Java applet 50 depicted in FIG. 2. The Java applet 50 is used by a Java script program, which is also included in the entrance web page loaded by the client 22, to access the smart card 26 via the PKCS#11 layer 44. For example, the Java applet 50 is used to open the PKCS#11 token to get access to keys and certificates stored on the smart card 26.

The entrance web page uses SSL in order to establish an encrypted channel. This encrypted channel is advantageous because at a later point in time a certificate stored on the smart card 26 and containing explicit information about the user has to be sent to the server infrastructure 16. Establishment of the encrypted channel may however be omitted if the certificate contains for example only anonymized information about the user.

At the beginning of a session, the smart card 26 might not be available yet. Consequently, during SSL only the server infrastructure 16 is authenticated. SSL user (client) authentication will in the present embodiment be performed at a later point in time.

The encrypted SSL channel with server authentication only is established between the client 22 and the entrance point of the intranet 52, i.e., the DMZ 54 with the proxy server 56. The encrypted SSL channel is established as follows. When the client 22 requests a connection with the server infrastructure 16 to load the entrance web-page (client hello), the proxy server 54 or another component acting as entrance point sends a certificate $C_{EP}$ associated with the server infrastructure 16. $C_{EP}$ has been signed by the CA server 60 or an external CA. The client 22 then checks to see if the CA is one it accepts and verifies the signature on $C_{EP}$ using the CA's public key.

In a next step, the client 22 compares the name in $C_{EP}$ with the Domain Name Server (DNS) name of the server it believes it is trying to contact. Following this comparison, the client 22 uses public key encryption to encrypt a secret with the public key $K_{EP}$ of the server infrastructure 16 as extracted from $C_{EP}$. The encrypted secret is sent to the server infrastructure 16 and the client 22 attempts to communicate with the server infrastructure 16 using encryption, where the (symmetric) keys are derived from the secret encrypted by the client 22 with the public key $K_{EP}$ of the server infrastructure 16.

If the client 22 can successfully communicate with the server infrastructure 16, then they must both be in possession of the same secret in order to derive the correct keys. This shows that the server infrastructure 16 possesses the correct private key and so authenticates the server infrastructure 16. The further communication between the client 22 and the server infrastructure 16 can now be performed via an encrypted channel.

2.2 Reader Mode Setting and Smart Card Activation

The card reader 24 shown in FIG. 1 can be used in two different modes depending on the type of smart card 26 used with the card reader 24. If a compatible smart card is operated in the card reader 24, the card reader 24 is switched to the "secure mode". In this mode the card reader 24 forwards security uncritical commands transparently to the smart card 26. However, for security critical commands such as PIN management or signature generation, the card reader 24 blocks the transparency and takes additional action. The secure mode thus requires that the card reader 24 checks all commands received and decides whether to forward them to the smart card 26 transparently or whether to take additional action. Some PKCS#15 commands which need to be recognized by the card reader 24 in the secure mode have already been discussed. The response of the card reader 24 to these and some further PKCS#15 commands will be described below.

If a non-compatible smart card 26 is operated in the card reader 24, the card reader 24 offers the user to switch to "transparent mode". In the transparent mode the card reader 24 acts as a class 1 reader which means that any commands received via the communication link 34 are not checked at all.

Figure 4:
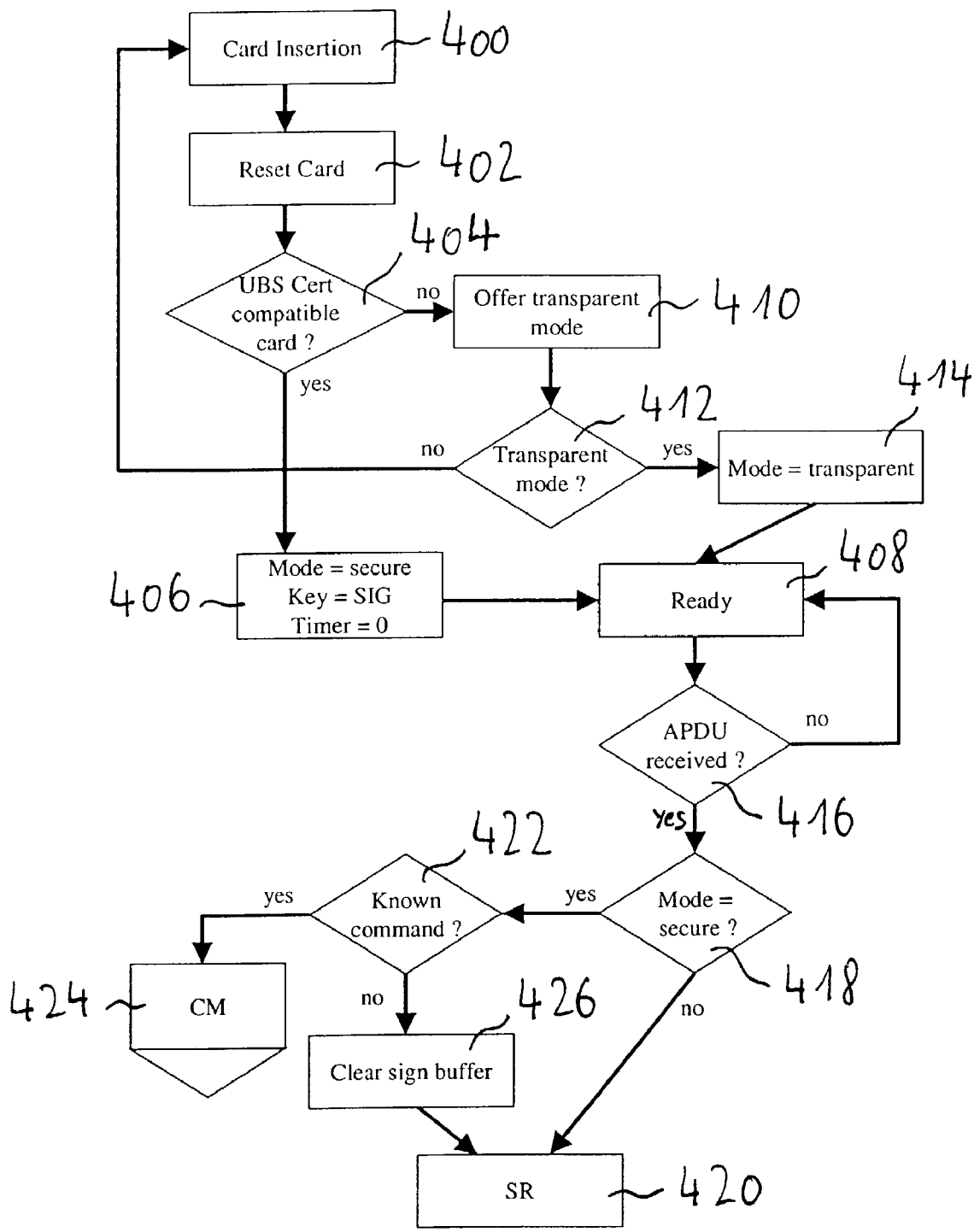
FIG. 4 shows a flow chart depicting the setting of the card reader's operational mode.

The mode setting described above will now be discussed in more detail with respect to the flow chart shown in FIG. 4.

In a first step 400 the banking entrance web page requests the user to insert the smart card 26 into the card reader 24, to press a login button on the web page and to follow the instructions displayed on the display 36 of the card reader 24. When the smart card 26 is inserted into or otherwise associated with the card reader 24, the card reader 24 detects whether it is a compatible smart card or not. To achieve this the card reader 24 resets the smart card 26 in step 402 to get its Answer To Reset (ATR) string. If the card reader 24 detects in step 404 that a specific predefined sub-string is included in the ATR, the card reader 24 continues with step 406. In step 406 the card reader 24 switches into secure mode, selects the PKCS#15 signature key $K_{PRIV\_SIG\_CLIENT}$ and resets an internal timer. In a next step 408 the card reader 24 displays a "ready" message.

If the card reader 24 determines in step 404 that the smart card 26 is not compatible it continues with step 410. In step 410 a message which offers the user to switch into transparent mode is displayed on display 38. In a next step 412 the user's response is assessed. If the user declines transparent mode, the method loops back to step 400. On the other hand, if the user accepts transparent mode, the card reader 24 switches into transparent mode in step 414. From step 414 the method continues with displaying a "ready" message in step 408.

After the appropriate mode has been set, the card reader 24 constantly monitors in step 416 if a command APDU is received from the client 22. If an APDU is received, the card reader 24 checks in step 418 if it operates in secure mode. In the case the card reader 24 does not operate in secure mode, the card reader 24 passes to step 420. In step 420 the command APDU received from the client 22 is sent to the smart card 26 and a resulting response APDU received from the smart card 24 is returned to the client 22.

On the other hand, if it is determined in step 418 that the card reader 24 is operated in secure mode, the card reader 24 checks in step 422 whether the received command APDU is known to the card reader software. If the command APDU is not known, the card reader 24 clears its sign buffer in step 426 and continuous with step 420 as explained above.

Otherwise, i.e., if it is determined in step 422 that the command APDU is known to the card reader software, the card reader 24 starts command processing for this command APDU in step 424. Flow charts for several exemplary command APDUs processed by the card reader 24 will be discussed in more detail below.

It should be noted that once a specific card reader mode has been selected, the card reader 24 will stay in this mode until the next card insertion event. Moreover, the web page which requests the user to insert the smart card 26 is provided with basic error handling mechanisms for the case that no smart card 26 is available or that the card reader 24 cannot be found.

In following, it is assumed that a compatible smart card 26 is inserted into the card reader 24 and that the card reader 24 is operated in secure mode.

2.3 Application Opening and User Verification

Once the smart card 26 has been activated and the mode of the card reader 24 has been set, a specific PKCS#15 application 30 on the smart card 26 is selected and opened. Furthermore, user verification takes place and information about keys and certificates stored on the smart card 26 as well as the reader certificate $C_{READER}$ are retrieved. These steps will now be explained in more detail with reference to the general overview depicted in FIG. 5. As becomes apparent from FIG. 5, the steps relating to opening of the PKCS#15 application, user verification as well as key and certificate retrieval involve the browser 48 including the Java applet 50 and the Java script program, the PKCS#11 layer 44, the card reader 24 as well as the PKCS#15 application 30 stored on the smart card 26.

The process starts (step 500) with an OPEN TOKEN command. When the Java applet 50 included in the browser 48 sends the OPEN TOKEN command to the PKCS#11 layer 44, a SELECT PKCS#15 command APDU is sent transparently from the PKCS#11 layer 44 via the card reader 24 to the PKCS#15 application 30 on the smart card 26 (steps 502 and 504). The PKCS#15 application 30 is selected directly via its application identifier (AID). The PKCS#15 application 30 returns a corresponding response APDU transparently to the PKCS11 layer 44 (steps 506 and 508).

After application selection, a VERIFY command APDU is sent from the PKCS#11 layer 44 to the card reader 24 to request the card reader 24 to do user verification (step 510). The VERFIY command authenticates the user against the PKCS#15 application 30 on the smart card 26 by means of a 6 to 11 digit PIN given in OP Global PIN encoding. The OP Global PIN is used for PIN verification and management. The VERIFY command sent from the PKCS#11 layer to the card reader 24 is not accompanied by PIN data because the card reader 24 does not accept PIN data in the secure mode.

In the secure mode the VERIFY command is recognized by the card reader 24 and causes the card reader 24 to take additional action. More specifically, the card reader 24 displays a message which requests the user to type in his PIN on the keypad 38. To verify the PIN the card reader 24 completes the VERIFY command by encoding the PIN entered by the user in OP format. Finally the card reader 24 sends the completed command to the smart card 26 in step 514. In step 515 the PKCS#15 application 30 verifies the PIN entered by the user. If the correct PIN has been entered, a corresponding response APDU is returned to and displayed by the card reader 24 (steps 516 and 518). If a wrong PIN has been entered, the PKCS#15 application 30 increments an OP Global PIN retry count and the smart card 26 returns an error (step 516) which is displayed in step 518.

If the smart card 26 returns an error and the smart card is not yet blocked, the card reader 24 allows a retry or cancellation of the operation and indicates the number of remaining retries. The PKCS#15 application 30 is automatically blocked, i.e., its life-cycle is set to BLOCKED, if the OP Global PIN retry count exceeds a predefined number of retries. If user verification fails for whatever reason, the card reader 24 forwards a status word concerning an error condition to the PKCS#11 layer 44. In addition, the card reader 24 displays the text "Card is blocked" in the case where the error condition indicates that the smart card 26 is blocked (no more retries).

The result of the user verification is sent from the card reader 24 to the PKCS#11 layer 44 in step 520. A plurality of further transparent command APDUs may follow (steps 522). A special non-transparent command APDU used during token opening is the GET READER CERTIFICATE command. This command allows the PKCS#11 layer 44 to request $C_{READER}$ from the card reader 24. The command returns the requested part of $C_{READER}$ to the client 22 and makes $C_{READER}$ visible in the PKCS#11 token. Multiple GET READER CERTIFICATE commands are necessary to read the whole $C_{READER}$. The communication between the PKCS#11 layer 44 and the card reader 24 concerning retrieval of $C_{READER}$ is indicated by steps 524 and 526.

When the processes of opening the PKCS#15 application 30, of user verification and of reader certificate retrieval have been performed, a TOKEN OPEN response is sent from the PKCS#11 layer 44 to the browser 48 in step 528.

Figure 6:
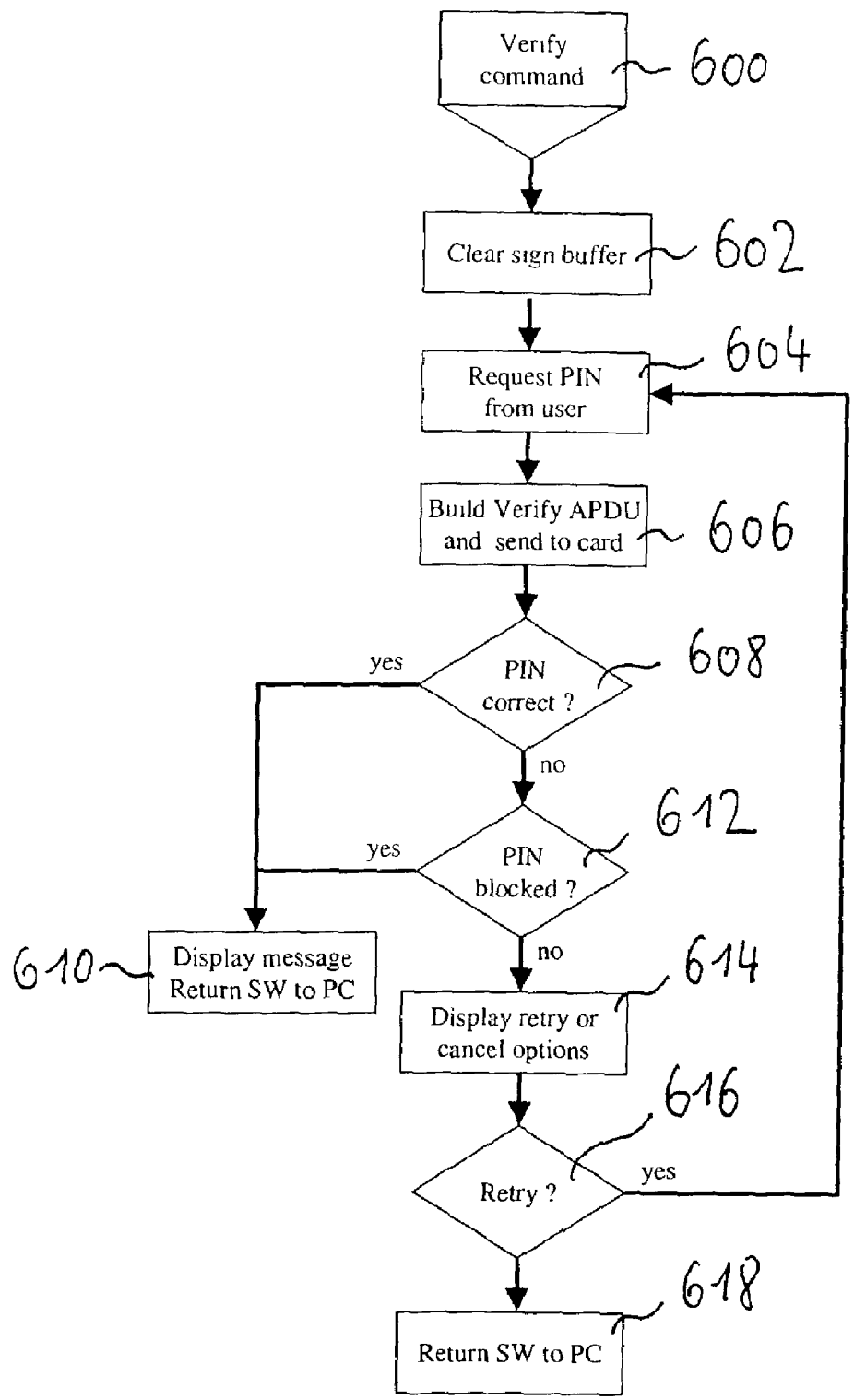
FIG. 6 shows a flow chart depicting the steps of user verification.

The command processing of the card reader 24 with respect to the VERIFY command will now be described in more detail with reference to the flow chart of FIG. 6.

Upon receipt of the VERIFY command in step 600, the card reader 24 clears the sign buffer in step 602 and requests the PIN from the user in step 604. In step 606 the card reader 24 builds the VERIFY command APDU using the PIN entered by the user and sends it to the smart card 26. The card reader 24 receives a VERIFY response APDU from the smart card 26 and checks in step 608 whether the VERIFY response APDU relates to a correct PIN. If the PIN is correct, the card reader 24 displays a corresponding message and returns a corresponding status word to the client 22 in step 610.

Otherwise the card reader 24 evaluates the VERIFY response APDU with respect to the question whether the PIN is blocked (step 612). Should the PIN be blocked, the card reader 24 displays a corresponding message and returns a corresponding status word to the client 22 in step 610. If the PIN is not blocked, the card reader 24 requests the user in step 614 to retry or to cancel. The user's answer is evaluated in step 616. Should the user wish to retry, the method loops back to step 604. Otherwise the method continues with step 618 and returns a corresponding status word to the client 22. The status words returned by the smart card 26 to the client 22 are the status words as returned by the smart card 26 in the last response APDU.

2.4 User Authentication

User authentication comprises several aspects. A major aspect of user authentication is the question whether the user is actually willing to be authenticated. Consequently, the authentication process is only started upon user approval. Furthermore, user authentication is performed as a two-step procedure. At least one of the two steps involves the application running on the application server 58.

2.4.1 User Approval

It has been mentioned in section 1.1.1 that different keys are stored on the smart card 26. In particular, client authentication and signing of transactions may thus be performed with different keys to allow for the enforcement of a secure key usage policy that clearly differentiates between an authentication of random data (e.g. SSL) and signing of meaningful content. It is therefore possible to implement a key usage policy which is mandatorily enforced whenever cryptographic commands like sign or decipher are to be sent to the smart card 26. Such a key usage policy gives the user the opportunity to explicitly control key usage.

A preferred solution of key usage control is certificate extension based. However, in the present embodiment file identifiers are used for that purpose. Since the file identifiers of the key files in the PKCS#15 application 30 are constant, i.e., the same for all smart cards and defined already during card personalization, the card reader 24 unambiguously knows which file holds the authentication key $K_{PRIV\_AUT\_CLIENT}$ and which one holds the signature key $K_{PRIV\_SIG\_CLIENT}$. Which file is to be accessed, i.e., which key is to be used for signing, can be selected by the MANAGE SECURITY ENVIRONMENT command APDU. This command APDU is a PKCS#15 command that is recognized by the card reader 24 and causes the card reader 24 to perform the steps depicted in FIG. 7.

Upon receipt of the MANAGE SECURITY ENVIRONMENT command APDU in step 700, the card reader 24 clears its sign buffer in step 702 and checks in step 704 whether the File IDentifier (FID) in the MANAGE SECURITY ENVIRONMENT command APCU is the string "AUTH" or not. If the FID equals "AUTH", the card reader 24 sets the currently selected PKCS#15 key to "AUTH" in step 706. Otherwise the currently selected PKCS#15 key is set to "SIG" in step 708. Regardless of the setting of the currently selected PKCS#15 key, the method continuous with step 710 where the MANAGE SECURITY ENVIRONMENT command APDU is forwarded to the smart card 26 and the resulting response APDU received from the smart card 26 is returned to the client 22.

In the case of PKCS#15 commands following the MANAGE SECURITY ENVIRONMENT command, the card reader 24 always remembers the FID of the last MANAGE SECURITY ENVIRONMENT command sent to the smart card 26. Doing this the reader always knows which key is in use and ensures that the authentication key $K_{PRIV\_AUT\_CLIENT}$ is never used without asking the user for approval.

For usage of the user authentication key $K_{PRIV\_AUT\_CLIENT}$ a specific security rule is set. This rule says that during a predetermined period of time after the user has approved key usage versus the card reader 24 it is possible to use $K_{PRIV\_AUT\_CLIENT}$ a predefined number of times without any additional request for approval. The card reader 24 enforces this rule by means of an internal timer. The period of time monitored by the internal timer should be selected such that typically the complete client authentication process, including two signatures with $K_{PRIV\_AUT\_CLIENT}$ and a single signature with $K_{PRIV\_READER}$, can be performed.

Figure 8:
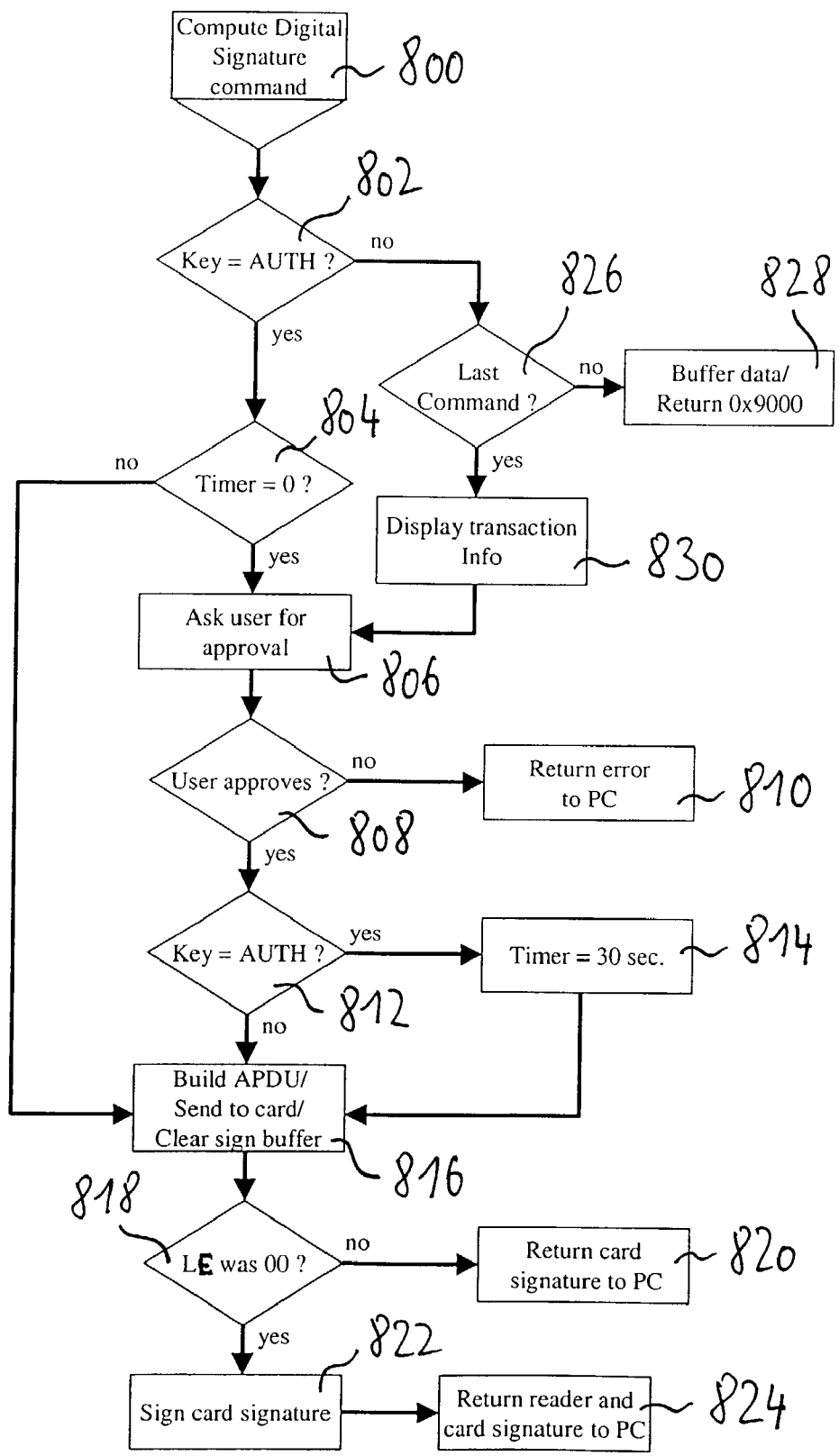
FIG. 8 shows a flow chart depicting the steps of user approval.

Any signing is initiated by a COMPUTE DIGITAL SIGNATURE command APDU. In the flow chart of FIG. 8 the behavior of the card reader 24 in response to the COMPUTE DIGITAL SIGNATURE command APDU is illustrated. For the moment, only the steps relevant for user approval in context with user authentication are considered although this command APDU may generally be used for signing given input data using any private key stored on the smart card 26.

Upon receipt of the COMPUTE DIGITAL SIGNATURE command APDU in step 800, the card reader 24 checks in step 802 whether the currently selected PKCS#15 key is the smart card's 26 authentication key $K_{PRIV\_AUT\_CLIENT}$. If this is the case, the method continues with step 804. In step 804 the card reader 24 polls its internal timer with respect to a time out. Since the timer is initially set to zero (see step 406 in FIG. 4), the card reader 24 will usually display a message on its display 38 which asks the user for authentication approval (step 806).

The card reader 21 then determines in step 808 whether or not the user approves by appropriately controlling the card reader 24. This control may for example relate to pressing of a specific button on the keypad 36. If the user does not approve, a corresponding error status word is sent to the client 22 in step 810. Otherwise it is checked once more if the currently selected PKCS#15 key is $K_{PRIV\_AUT\_CLIENT}$ in step 812. If this is the case, the internal timer of the card reader 24 is set to 30 s and is started (step 814). The card reader 24 then continues with step 816 and builds the corresponding command APDU which is subsequently sent to the smart card 26. Moreover, the card reader 24 clears its sign buffer.

As will become apparent from the following sections, a complete user authentication cycle requires that the steps 800 to 816 are performed twice. In the first user authentication step the timer is set to 30 s and started in step 814. In the second user authentication cycle the card reader 24 determines in step 804 whether the timer, which has been started in step 814 of the first user authentication step, has already expired. If this is the case, the user is asked once more for approval in step 806. Otherwise the card reader 24 continues immediately with step 816 and builds the command APDU which is to be sent to the smart card 26. This means that if the two user authentication steps are performed within 30 s, the user is asked only once, namely at the beginning of the first user authentication step, for approval. Otherwise the user will have to approve each of the two user authentication steps separately. This enhances authentication security and prevents misuse of $K_{PRIV\_AUT\_CLIENT}$.

2.4.2 First User Authentication Step: SSL Client Authentication

Figure 5:
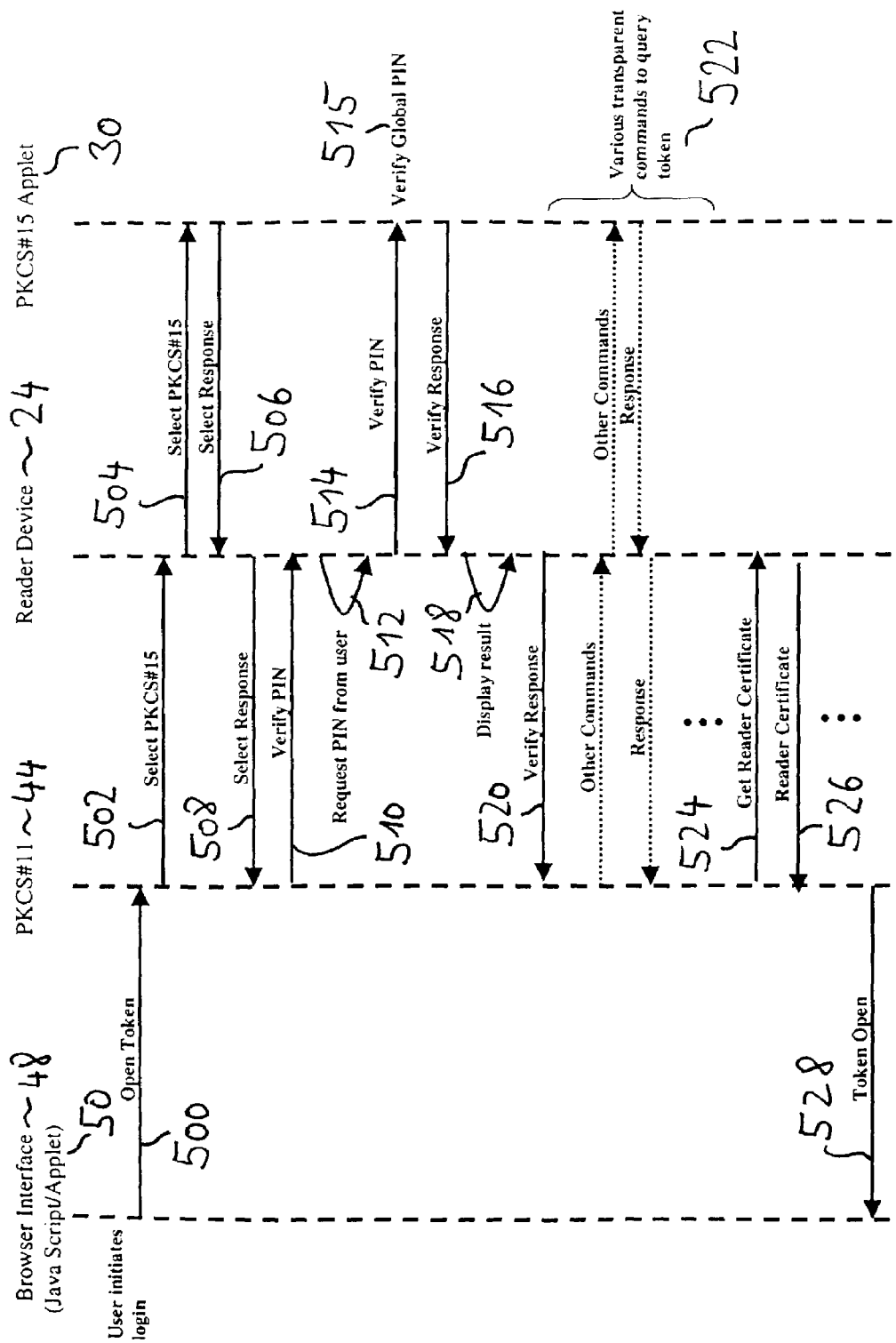
FIG. 5 shows an overview of opening an application on the smart card and of user verification.

Once the Java applet 50 running inside the browser 48 (see FIG. 2) has successfully opened the PKCS#11 token as depicted in FIG. 5, it redirects the client 22 from the entrance web page to a secure banking web page. As has been mentioned in section 2.1, so far only server authentication has been performed while establishing the encrypted channel. The client's 22 request of the secure banking web page now additionally triggers SSL with user authentication. User authentication is performed to transform the previously established encrypted channel into a mutually authenticated encrypted channel.

It should be noted, however, that an authenticated channel might also be established if no encrypted channel is available yet. As has been mentioned above, in the exemplary embodiment SSL client authentication is performed via the encrypted channel because the user's certificate $C_{AUT\_CLIENT}$, which is sent to the server infrastructure 16 during SSL client authentication, comprises user data that are subject to the banking secret. In the case the certificate contains anonymized user data, user authentication could at least in part be performed unencrypted.

The secure banking web page requires the SSL protocol with user authentication. SSL authentication is triggered by the server infrastructure 16 (server hello request) and basically comprises the SSL steps discussed in section 2.1 in conjunction with establishing the encrypted channel. It should be noted that during SSL authentication specific parameters like the session keys are initialized anew. This means for example that the symmetric keys used for a newly established secure communication channel differ from the symmetric keys used on the encrypted channel.

During SSL authentication the browser 48 sends a COMPUTE DIGITAL SIGNATURE command APDU to the smart card 26 to cause the smart card 26 to sign a hash value with the authentication key $K_{PRIV\_AUT\_CLIENT}$. The card reader 24 recognizes the COMPUTE DIGITAL SIGNATURE command APDU and checks the internal timer for authentication key usage as has been described with reference to the flow chart depicted in FIG. 8 (steps 800 to 816). In step 816, the PKCS#15 application 30 on the smart card 26 is instructed to sign a hash value with $K_{PRIV\_AUT\_CLIENT}$. When the signature is returned from the smart card 26 to the card reader 24, the card reader checks in step 818 an LE code associated with the COMPUTE DIGITAL SIGNATURE command to determine if the signature returned by the smart card 26 has to be signed by the card reader 24. In the case of the first user authentication step this is not the case (LE≠00) and the card reader 24 returns the hash value signed with $K_{PRIV\_AUT\_CLIENT}$ to the client 22 in step 820 without taking any further action.

Figure 9:
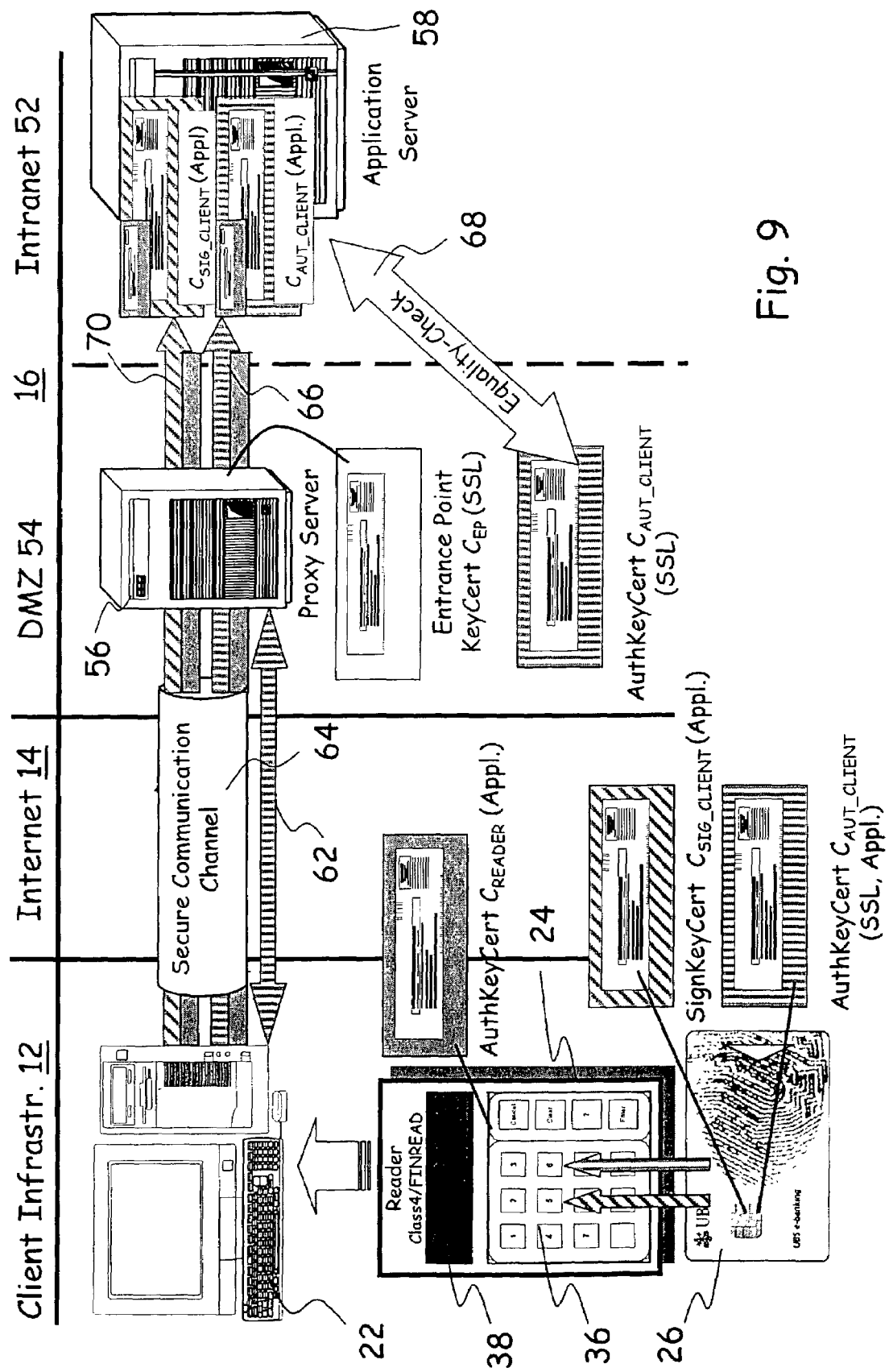
FIG. 9 shows an overview of the user authentication process.

The first user authentication step will now be described in more detail with reference to FIG. 9. In FIG. 9 an overview of the complete user authentication process is given. In the exemplary embodiment the user authentication process is completely performed over an encrypted channel.

The first user authentication step starts as indicated by a double arrow 62 between the client 22 and the proxy server 56. The first user authentication step is performed on the SSL level using the authentication key $K_{PRIV\_AUT\_CLIENT}$ stored on the smart card 26 and a challenge derived among others from the encryption key $K_{EP}$ provided by the server infrastructure 16. Since in the embodiment described in context with FIG. 9 the first user authentication step is entrance point controlled, the encryption key $K_{EP}$ is the entrance point's encryption key, i.e., an encryption key managed for example by the proxy server 56. The (public) encryption key $K_{EP}$ is part of the certificate $C_{EP}$ whereas, for security reasons, the according private key is stored on a separate hardware module that can be accessed by the proxy server 56.

After a successful first user authentication step, a secure communication channel 64 is established. In the embodiment of FIG. 9 the secure communication channel 64 is a mutually authenticated end-to-end connection between the client 22 and an entrance point of the intranet 52 in the form of the DMZ 54 including the proxy server 56. The secure communication channel 64 stretches over the previously established encrypted channel. The further communication between any component of the intranet 52, for example the application server 58, and the client 22 is performed via this secure communication channel 64. The further communication comprises in particular a second authentication step and the transfer of signed transaction data.

2.4.3 Second User Authentication Step: Authentication on the Aplication Layer

After successful SSL authentication (first user authentication step), the application server 58 initiates an additional, second authentication step to authenticate both the smart card 26 and the card reader 24. To that end the application server 58 sends a random challenge to the client 22 via the secure communication channel 64 and requests a double signature. This means that the challenge is to be signed by the smart card 26 using the authentication key $K_{PRIV\_AUT\_CLIENT}$ and the resulting signature is then to be signed by the card reader 24 using the card reader's 24 authentication key $K_{READER}$.

From the card reader's 24 point of view the second user authentication step is similar to the first user authentication step described above with reference to FIG. 8 (steps 800 to 816). The only difference is that a double signature is required. This requirement is indicated by the LE code associated with the COM-COMPUTE DIGITAL SIGNATURE command APDU. If the LE code is set to 00, the card reader 24 knows that he has to sign data received from the smart card 26. If the card reader 24 thus determines in step 818 that the LE code equals 00, it signs the signature received from the smart card 26 with its own authentication key $K_{READER}$ in step 822 and returns the double signature to the client 22 in step 824.

The second authentication step will now be described in context with the overview depicted in FIG. 9.

After the secure communication channel 64 has been established during the first user authentication step, the application server 58 sends its challenge via the secure communication channel 64 to the client 22. The client 22 causes this challenge to be signed by both the smart card 26 and the card reader 24 and returns the signed challenge, as indicated by arrow 66, to the application server 58.

The application server 58 then checks the authenticity of the signatures on an application level using the public keys of both the smart card 24 and the card reader 26. These public keys are part of the card reader's 24 certificate $C_{READER}$ and the smart card's 26 certificate $C_{AUT\_CLIENT}$. Such a check, of course, requires that the two certificates are known to the application server 58 prior to the second user authentication step. For example, the two certificates may have been transmitted via the encrypted secure communication channel 64. Furthermore, the certificates may have been created by the server 60 with certificate authority functionality which is part of the intranet 52 (see FIG. 3).

In order to increase authentication security, the second user authentication step further comprises an equality check as indicated by the double arrow 68. During this equality check it is determined if one and the same user authentication key $K_{PRIV\_AUT\_CLIENT}$ has been used during the first and the second user authentication step. To that end, the proxy server 56 or another component of the intranet's 52 entrance point temporarily keeps record of the smart card's 26 authentication key $K_{PRIV\_AUT\_CLIENT}$ used during the first user authentication step. The equality check is initiated by the application server 58.

2.5 Transaction Signing

Figure 7:
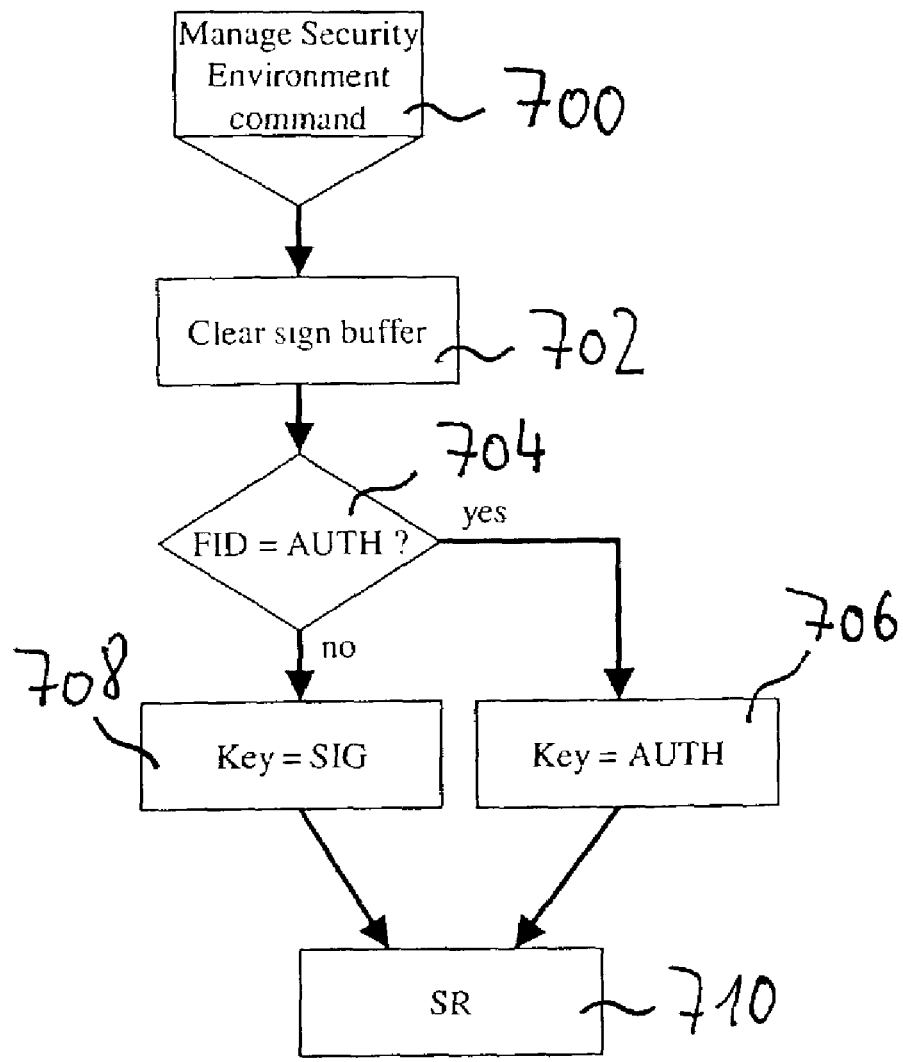
FIG. 7 shows a flow chart depicting the steps of key management.

Whenever a banking transaction has to be signed by the smart card 26, the Java applet 50 running inside the browser 48 sends a message including information about the desired financial transaction to the smart card 26 for signing with the signature key $K_{PRIV\_SIG\_CLIENT}$. This message sent to the smart card 26 is accompanied by the COMPUTE DIGITAL SIGNATURE command APDU. If the last signature has been generated with the smart card's 26 authentication key $K_{PRIV\_AUT\_CLIENT}$, a MANAGE SECURITY ENVIRONMENT command APDU (FID≠AUTH) described in context with FIG. 7 is sent to the smart card 26 to set the appropriate key prior to the COMPUTE DIGITAL SIGNATURE command APDU.

If, and only if, the signature key $K_{PRIV\_SIG\_CLIENT}$ is in use, the card reader 24 enables command chaining to allow signing of data of arbitrary length. In the case of command chaining, the card reader 24 does not send any command to the smart card 26 but only buffers the data internally. A specific class byte of $00_{HEX}$ indicates the last (or only) command (steps 826 and 828 shown in FIG. 8). When the card reader determines in step 826 that the last command APDU is received it displays the message (e.g. "transfer 100.000 CHF") on its display 38 as a request for user approval (steps 830 and 806). The steps that ensue correspond to the steps depicted in FIG. 8 as described in conjunction with user authentication. The only difference is that if the user approves the transaction, the card reader 26 calculates a hash value (SHA-1) over the message and sends the hashed message to the smart card 26 for signing.

In the case a banking transaction has to be signed, the COMPUTE DIGITAL SIGNATURE command APDU is associated with an LE code of 00 indicating a double signature request (steps 818, 822, 824). To generate the second signature, the card reader 26 calculates a hash value (SHA-1) over the signature received from the smart card 26, adds PKCS#11 (e.g. block type 1) padding and finally does the RSA private key signing with $K_{READER}$. The latter explicitly ensures that the smart card 26 is operated in a genuine card reader 24 and cryptographically links the card reader authentication to a smart card based transaction. This not only allows the application server 58 to identify which card reader 24 is in use but also enables the application server 58 to reject signatures from certain card readers 26, for example in the case of reader certificate revocation.

The signed data transmission in context with a banking transaction is indicated by arrow 70 in FIG. 9. As becomes apparent from FIG. 9, the signed data transmission 70 is conducted via the secure communication channel 64 which in the embodiment has been erected on the encrypted channel. Both the smart card's 26 signature key $K_{PRIV\_SIG\_CLIENT}$ and the card reader's 24 authentication key $K_{READER}$ are in use when a signed data transmission is performed. From FIG. 9 it becomes further apparent that double signatures (arrows 66 and 70) are only used (on the application layer) by the application server 58.

Figure 10:
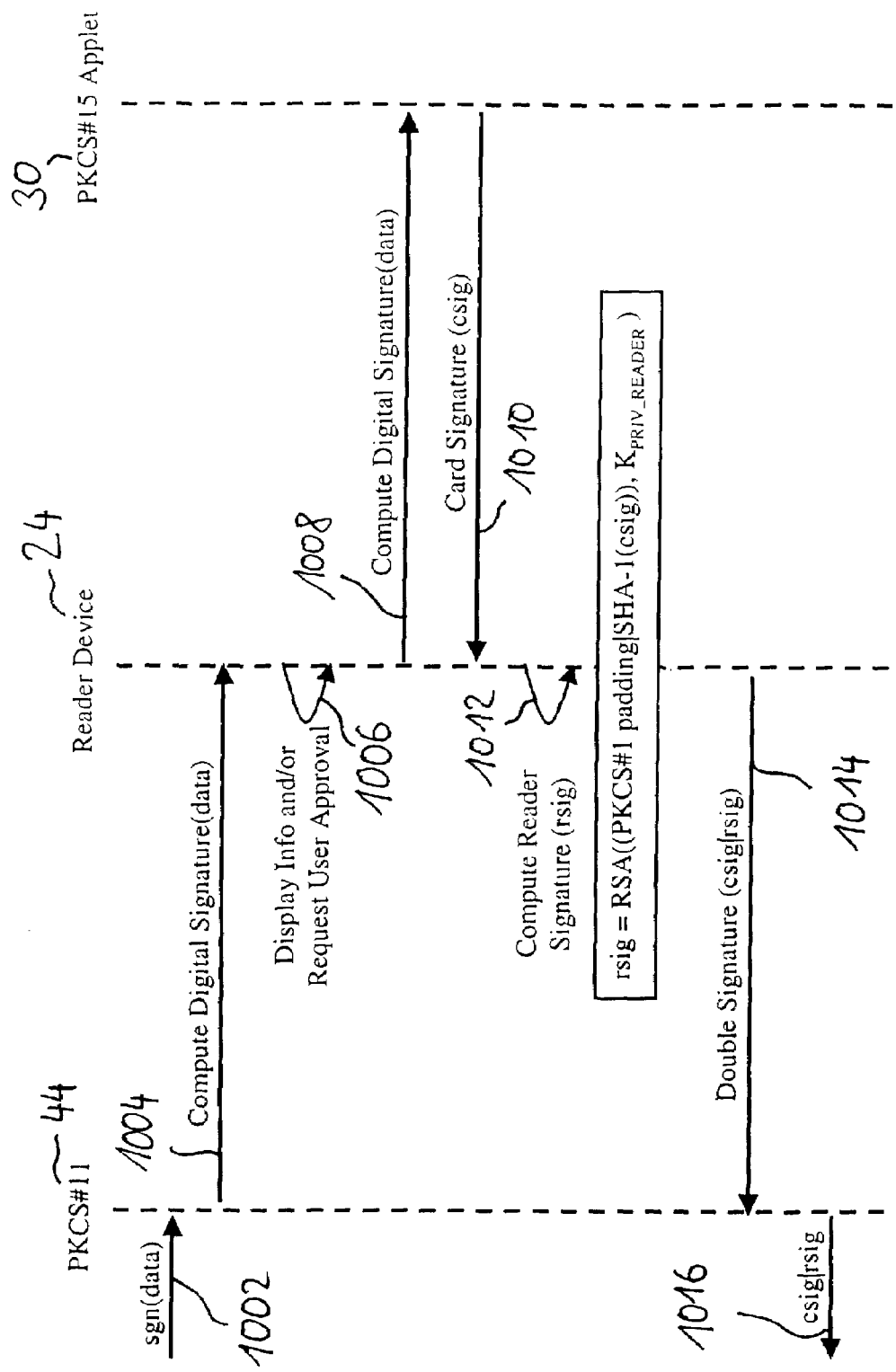
FIG. 10 shows an overview of generating a double signature.

The interaction between the PKCS#11 layer 44, the card reader 24 and the PKCS#15 application 30 on the smart card 26 when a double signature is to be generated will now be described in more detail with reference to FIG. 10.

When the PKCS#11 layer 44 receives a request relating to a specific message (data) to be signed with a double signature (step 1002), it generates a corresponding COMPUTE DIGITAL SIGNATURE command APDU with respect to this message and sends it off to the card reader 24 in step 1004. The card reader 24 recognizes this command APDU and takes additional action in step 1006. This additional action may comprise displaying the data to be signed and a request for user approval.

Then, the card reader 24 forwards the COMPUTE DIGITAL SIGNATURE command APDU together with the (hashed) data to be signed to the PKCS#15 application 30 on the smart card 26. The PKCS#15 application 30 signs the data received from the card reader 24 and returns in step 1010 a response APDU including the signed data (CSIG) to the card reader 24. In step 1012 the card reader 24 computes the reader signature (RSIG) on CSIG as indicated in FIG. 10. In step 1014 the card reader 24 sends the double signature to the PKCS#11 layer 44 which forwards the double signature to the browser 48 which sends it off to the application server 58 for verification.

When the banking transaction is completed and the user chooses to log out of the banking session, the smart card 26 is reset in order to invalidate the PIN. Other events such as unexpected smart card errors might also terminate the banking session. The events terminating the banking session are defined on the application level and do not require further card reader functionality.

2.6 Remote Smart Card Management

Remote smart card management, an aspect of the invention which has been briefly mentioned a plurality of times in the above discussion, is a feature which can be practiced either in combination with the user authentication method or separate therefrom. For remote smart card management purposes a (secure) end-to-end management channel between the smart card 26 on the one hand and the server infrastructure 16 on the other hand has to be established. The management channel may be set up on the basis of the encrypted channel which is established at the beginning of a connection to the server infrastructure 16 (see section 2.4.1) or on the basis of the secure communication channel 64 established during the first user authentication step or on the basis of both channels.

Figure 11:
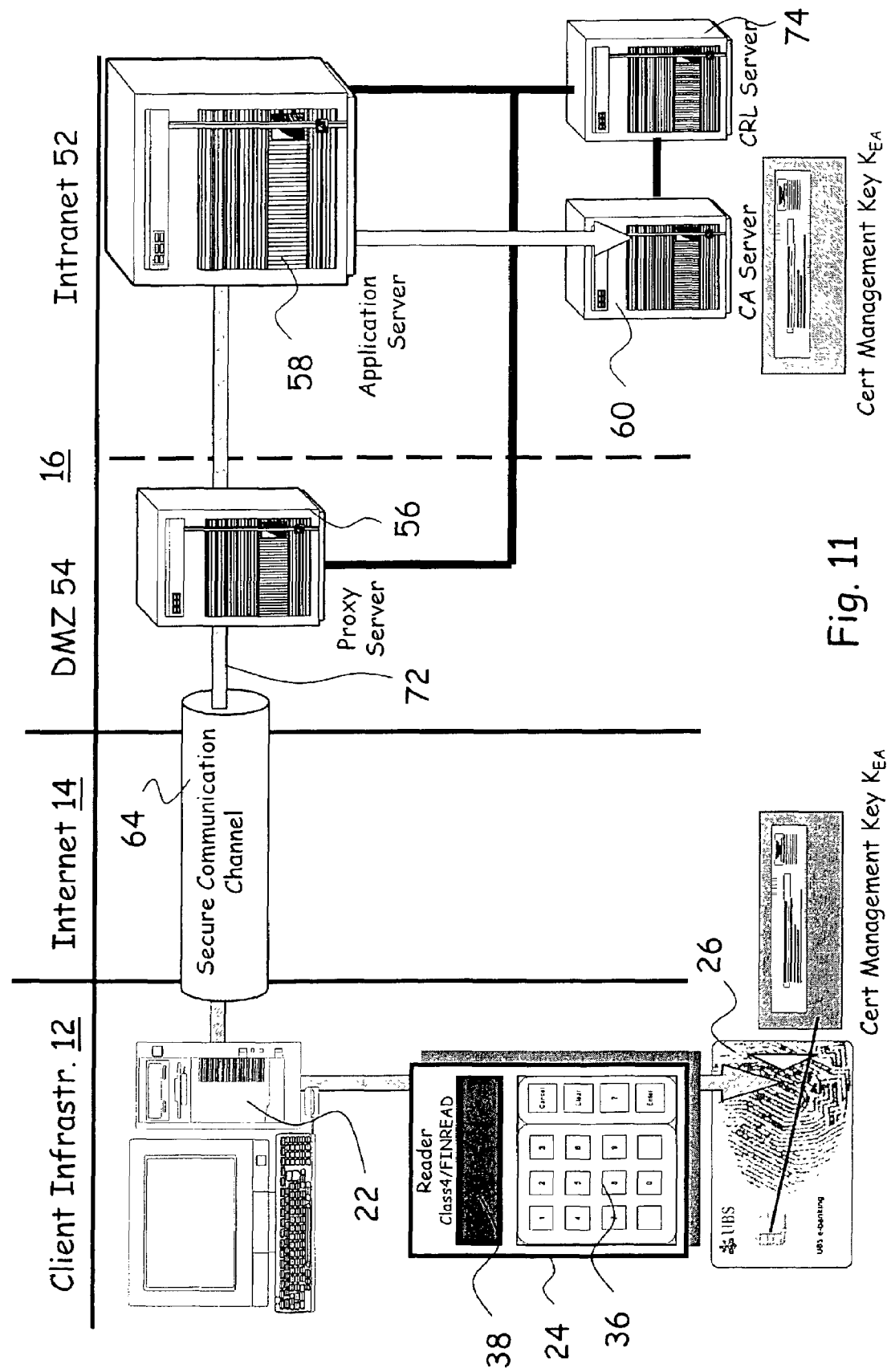
FIG. 11 shows an overview of remote smart card management.

In FIG. 11, an overview of the components involved in remote smart card management is depicted. In the embodiment depicted in FIG. 11, the management channel indicated by double arrow 72 is established on the basis of the secure communication channel 64 that has been set up during the first user authentication step. As becomes apparent from FIG. 11, the card reader 24 recognizes smart card management commands and forwards them transparently to the smart card 26. This management channel 72 bypasses the card reader 24 because the management commands are unknown to the card reader 24 and thus transparently forwarded to the smart card 26. This is made possible by a special extension in the PKCS#11 library.

The main aspects of remote smart card management are PKCS#15 security management and OP smart card management. In the following only PKCS#15 security management will be considered further. OP smart card management basically includes PKCS#15 security management and characteristic functionalities related to aspects like post-issuance application loading or card auditing.

PKCS#15 security management will now be discussed in more detail with reference to FIG. 11. As can be gathered from FIG. 11, the management channel 72 is established between the smart card 26 and the CA server 60 of the intranet 52 through the proxy server 56 in the DMZ 54, bypassing the application server 58. The management channel 72 is established via the PKCS#15-based secure management channel. Encryption on the management channel 72 is performed using the smart card specific triple DES key $K_{E4}$. The PKCS#15 application on the smart card 26 provides a second PIN which can only be verified over the secure (encrypted) management channel 72. The second PIN is a smart card issuer's PIN. All write access conditions of the PKCS#15 files on the smart card 26 are bound to this PIN.

Once the secure management channel has been established and the issuer PIN has been verified, the CA server 60 can modify files or create new files on the smart card 26 and may thus, for instance, update one or more certificates or add one or more keys. The CA server 60 may therefore not only generate the keys and certificates on the smart card 26 upon issuance thereof but also manage these credentials after smart card issuance.

As can be seen from FIG. 11, the server infrastructure 16 additionally comprises Certificate Revocation List (CRL) functionalities. To that end the intranet 52 comprises a CLR server 74 in communication with the CA, server 60, the application server 58 and the proxy server 56. The CRL server 74 manages certificate revocation lists and blocks a banking transaction or any other operation requested by the client 22 if it determines that a certificate provided by the client infrastructure 12 has been revoked.

2.7 Secure E-mail

The authentication solution discussed above can also be utilized for S/MIME to offer additional value to the user. I.e., once having a smart card infrastructure in place it may also be used by programs such as Microsoft Outlook or Netscape Messenger. This might require to store a further key pair on the smart card 26 for S/MIME usage. Alternatively, the authentication key $K_{PRIV\_AUT\_CLIENT}$ could be used for S/MIME. This, however, may require replacing the authentication certificate $C_{AUT\_CLIENT}$ with a certificate suitable for S/MIME (non-anonymous certificate). Remote smart card management as described in the previous section could be used for this purpose.

Figure 12:
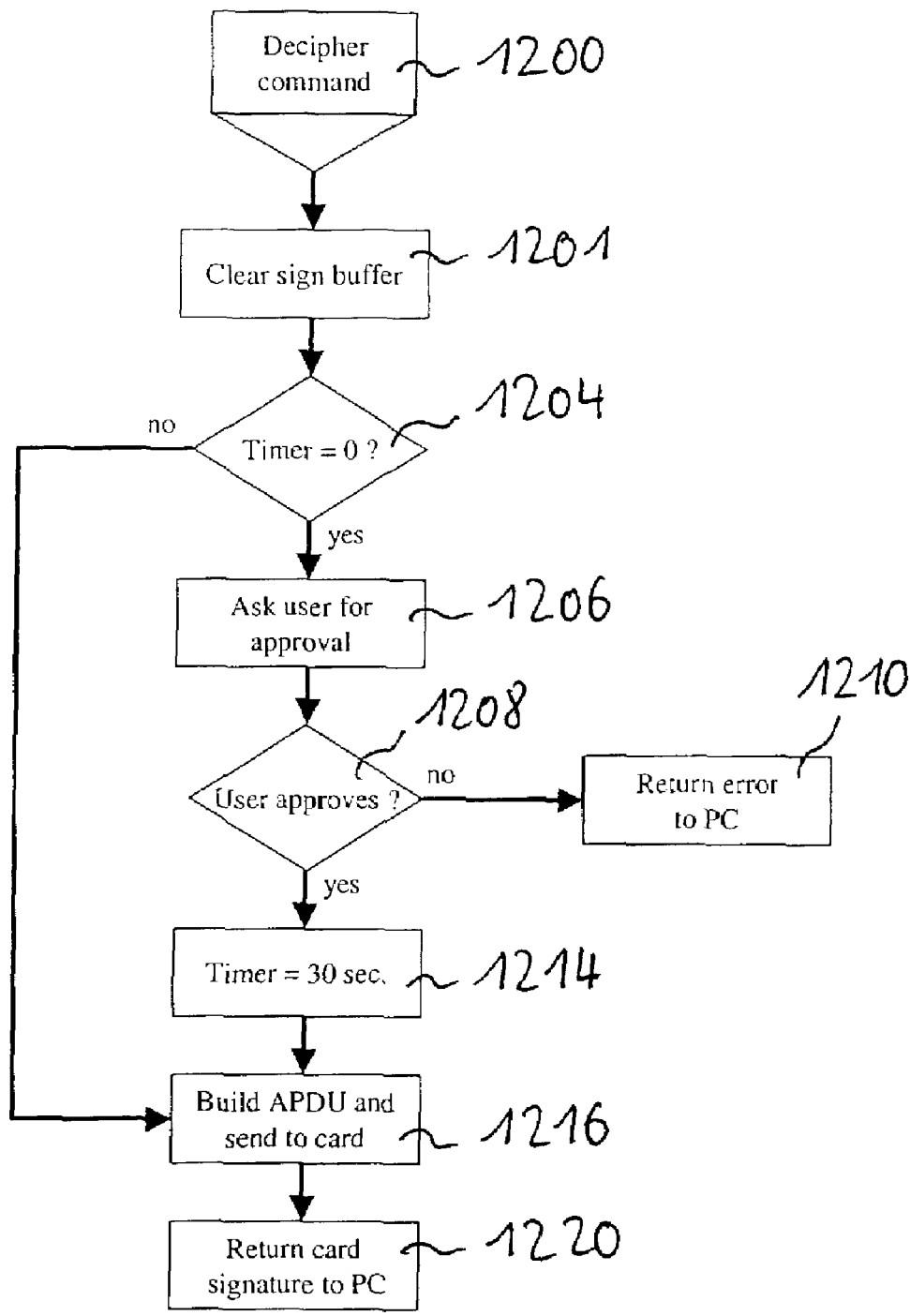
FIG. 12 shows a flow chart depicting the steps preceding a secure e-mail transmission.

If S/MIME is to be supported, the card reader's 26 software must additionally support a DECIPHER command APDU. This command APDU deciphers data and could be used if the authentication key $K_{PRIV\_AUT\_CLIENT}$ is used for S/MIME. The smart card 26 does not allow deciphering data using the signature key $K_{PRIV\_SIG\_CLIENT}$. The DECIPHER command should be forwarded transparently to the smart card 26 by the card reader 24, only enforcing the key usage policy involving an user approval process as depicted in the flow chart of FIG. 12. Since the individual steps shown in FIG. 12 essentially correspond to the steps depicted in FIG. 8 a more detailed description of FIG. 12 is omitted.

The invention claimed is:

1. A method of performing user authentication over a client in communication via a first network with a server infrastructure including an application server, the client having access via a user-controllable card reader to a smart card, the method comprising:
   providing a first authentication key ($K_{PRIV\_AUT\_CLIENT}$) stored on the smart card;
   providing a second authentication key ($K_{READER}$) stored in the card reader;
   performing a first user authentication step between the client and the server infrastructure using the first authentication key ($K_{PRIV\_AUT\_CLIENT}$), the first user authentication step comprising a communication from the server infrastructure to the client that is signed by the smart card using the first authentication key ($K_{PRIV\_AUT\_CLIENT}$), the first authentication step being performed over an established or in context with establishing an encrypted channel over the first network; and
   performing a second user authentication step between the client and the application server using both the first authentication key ($K_{PRIV\_AUT\_CLIENT}$) and the second authentication key ($K_{READER}$), the second user authentication step comprising a communication from the application server to the client that is signed by both the smart card using the first authentication key ($K_{PRIV\_AUT\_CLIENT}$) and also the card reader using the second authentication key ($K_{READER}$).

2. The method of claim 1, wherein a dependence of the first user authentication step on an encryption key ($K_{EP}$) of the server infrastructure is introduced.

3. The method of claim 1, wherein the server infrastructure further includes:
   (a) a second network in which the application server is arranged; and
   (b) an entrance point of the second network, the entrance point being coupled to the first network.

4. The method of claim 3, wherein the first user authentication step is entrance point-controlled.

5. The method of claim 1, wherein the first user authentication step is performed on a layer below an application layer and the second user authentication step is performed on the application layer.

6. The method of claim 1, wherein the first user authentication step comprises a first substep during which the encrypted channel is established and a second substep during which the encrypted channel is used to transmit information required for user authentication.

7. The method of claim 1, further comprising verifying that the first authentication key ($K_{PRIV\_AUT\_CLIENT}$) has been used during both the first and the second user authentication step.

8. The method of claim 1, wherein user authentication is started only upon user approval on the user-controlled card reader.

9. The method of claim 1, wherein a signature key ($K_{PRIV\_SIG\_CLIENT}$) is associated with the smart card.

10. The method of claim 9, further comprising performing a signed data transmission between the client and the application server using both the signature key ($K_{PRIV\_SIG\_CLIENT}$) and the second authentication key ($K_{READER}$).

11. The method of claim 10, wherein the signed data transmission comprises generating a first signature by signing data with the signature key ($K_{PRIV\_SIG\_CLIENT}$), generating a second signature by signing the first signature with the second authentication key ($K_{READER}$), and transmitting both signatures, if necessary together with the data, to the application server.

12. The method of claim 3, further comprising establishing a secure end-to-end management channel between the second network and the smart card.

13. The method of claim 12, further comprising at least one of modifying files and creating new files on the smart card via the management channel.

14. A computer program product having program code means for performing the steps of claim 1 when the computer program product is run on a computer system.

15. The computer program product of claim 14, stored on a computer readable recording medium.

16. A server infrastructure comprising:
   an application server;
   an encrypted channel between the server infrastructure and a client infrastructure across a first network, the client infrastructure including a client and a user-controllable card reader, the encrypted channel being established prior to or in context with a first user authentication step that is performed on the basis of a first authentication key ($K_{PRIV\_AUT\_CLIENT}$) stored on a smart card; and
   an authenticated link between the application server and the client infrastructure, the authenticated link being established in a second authentication step between the application server and the client infrastructure on the basis of both the first authentication key ($K_{PRIV\_AUT\_CLIENT}$) stored on the smart card and a second authentication key ($K_{READER}$) stored in the card reader.

17. The server infrastructure of claim 16, wherein the first network is the Internet or an insecure external network.

18. The server infrastructure of claim 16, wherein the server infrastructure further includes:
   a second network, preferably a secure Intranet, in which the application server is arranged; and
   an entrance point of the second network, the entrance point being coupled to the first network.

19. The server infrastructure of claim 18, wherein the entrance point comprises a proxy server component and/or is situated on the application server.

20. The server infrastructure of claim 16, further comprising a signed data transmission between the client infrastructure and the application server, the signed data transmission being established on the basis of a signature key ($K_{PRIV\_SIG\_CLIENT}$) stored on the smart card and the second authentication key ($K_{READER}$) stored in the card reader.

21. The server infrastructure of claim 18, wherein the second network comprises the functionality of a certificate authority.

22. The server infrastructure of claim 21, further comprising a secure end-to-end management channel between the second network comprising the certificate authority functionality and the smart card.

23. A network system comprising:
   a client infrastructure with a client associated with a card reader for a smart card, the smart card having a first secure memory location storing a first authentication key ($K_{PRIV\_AUT\_CLIENT}$) and the card reader having a second secure memory location storing a second authentication key ($K_{READER}$);
   a server infrastructure with an application server;
   an encrypted channel between the client infrastructure and the server infrastructure across a first network, the encrypted channel being established prior to or in context with a first user authentication step that is performed on the basis of the first authentication key ($K_{PRIV\_AUT\_CLIENT}$); and
   an authenticated link between the client infrastructure and the application server, the authenticated link being established in a second authentication step between the client infrastructure and the application server on the basis of both the first authentication key ($K_{PRIV\_AUT\_CLIENT}$) and the second authentication key ($K_{READER}$).

24. The network system of claim 23, wherein the smart card has a third secure memory location for storing a signature key ($K_{PRIV\_SIG\_CLIENT}$).

25. The network system of claim 23, wherein the client comprises a wrapper for establishing a communication link between a client application and one of the plurality of different smart cards.

26. The network system of claim 23, wherein the card reader is at least a class 4 reader or a FINREAD-compatible card reader.

* * * * *